(12) United States Patent
Jang et al.

(10) Patent No.: US 11,301,371 B2
(45) Date of Patent: Apr. 12, 2022

(54) MEMORY CONTROLLER AND OPERATING METHOD THEREOF

(71) Applicants: SK hynix Inc., Gyeonggi-do (KR); Industry-Academic Cooperation Foundation, Yonsei University, Seoul (KR)

(72) Inventors: Junhyeok Jang, Daejeon (KR); Myoungsoo Jung, Daejeon (KR)

(73) Assignees: SK hynix Inc., Gyeonggi-do (KR); Industry-Academic Cooperation Foundation, Yonsei University, Seoul (KR)

( * ) Notice: Subject to any disclaimer, the term of this patent is extended or adjusted under 35 U.S.C. 154(b) by 1 day.

(21) Appl. No.: 16/856,851

(22) Filed: Apr. 23, 2020

(65) Prior Publication Data

US 2021/0081313 A1  Mar. 18, 2021

(30) Foreign Application Priority Data

Sep. 16, 2019 (KR) ........................ 10-2019-0113717

(51) Int. Cl.
*G06F 12/02* (2006.01)
*G06F 12/0882* (2016.01)
(Continued)

(52) U.S. Cl.
CPC ...... *G06F 12/0246* (2013.01); *G06F 12/0873* (2013.01); *G06F 12/0882* (2013.01);
(Continued)

(58) Field of Classification Search
CPC . G06F 11/34–3495; G06F 12/08–0897; G06F 12/0246; G06F 2212/401; G06F 2212/72–7211; G06N 3/06
See application file for complete search history.

(56) References Cited

U.S. PATENT DOCUMENTS 9,703,594 B1\* 7/2017 Kamboj .............. G06F 11/3409
2014/0173177 A1\* 6/2014 Benhase ............. G06F 12/0246
711/103

(Continued)

FOREIGN PATENT DOCUMENTS

KR    10-2011-0124044    11/2011
KR    10-2014-0114618     9/2014
KR    10-2018-0058890     6/2018

OTHER PUBLICATIONS

Xia et al., Ddelta: A deduplication-inspired fast delta compression approach, Performance Evaluation, Jul. 10, 2014, pp. 258-272, vol. 79, ISSN: 0166-5316. Elsevier, Netherlands.
(Continued)

*Primary Examiner* — Nicholas J Simonetti
(74) *Attorney, Agent, or Firm* — IP & T Group LLP

(57) ABSTRACT

An electronic device is provided. A memory controller, having an improved response time for an input/output request and increased capacity of Dynamic Random Access Memory (DRAM) according to the present disclosure, includes an available-time prediction component configured to perform a machine learning operation using a Recurrent
(Continued)

Neural Network (RNN) model based on input/output request information about an input/output request input from a host, and to predict an idle time representing a time during which the input/output request is not expected to be input from the host and a data compression controller configured to generate, in response to the idle time longer than a set reference time, compressed map data by compressing map data which indicates a mapping relationship between a logical address provided by the host and a physical address indicating a physical location of a memory block included in the memory device.

20 Claims, 15 Drawing Sheets

(51) Int. Cl.
*G06F 12/0873* (2016.01)
*G06N 3/06* (2006.01)
(52) U.S. Cl.
CPC ......... *G06N 3/06* (2013.01); *G06F 2212/401* (2013.01); *G06F 2212/7201* (2013.01); *G06F 2212/7209* (2013.01)

(56) References Cited

U.S. PATENT DOCUMENTS

2016/0259744 A1* 9/2016 Kim ................. G06F 13/404
2019/0317901 A1* 10/2019 Kachare ............. G06F 12/1009
2021/0011845 A1* 1/2021 Huang ............... G06F 12/1009

OTHER PUBLICATIONS

Park et al., An Adaptive Idle-Time Exploiting Method for Low Latency NAND Flash-Based Storage Devices, IEEE Transactions on Computers, May 2014, pp. 1085-1096, vol. 63, No. 5, IEEE, USA.

Xia et al., A Comprehensive Study of the Past, Present, and Future of Data Deduplication, Proceedings of the IEEE, Sep. 2016, pp. 1681-1710, vol. 104, No. 9, IEEE, USA.

Kavalanekar et al., Characterization of Storage Workload Traces from Production Windows Servers, Symposium, 2008, pp. 119-128, IEEE International Symposium on Workload Characterization, USA.

Kang et al., Dynamic Management of Key States for Reinforcement Learning-assisted Garbage Collection to Reduce Long Tail Latency in SSD, Research-Article, Jun. 2018, pp. 1-6, Association for Computing Machinery, USA.

Colah C., Understanding LSTM Networks, Article, Aug. 27, 2015, Colah's Blog, Online.

* cited by examiner

TABLE OF TARGET BLOCK ACCORDING TO NUMBER OF VALID PAGES

| Block # | NUMBER OF VALID PAGES |
|---------|-----------------------|
| BLK1    | 7                     |
| BLK2    | 4                     |
| BLK3    | 15                    |
| BLK4    | 11                    |
| BLK5    | 19                    |

TABLE OF TARGET BLOCK ACCORDING TO READ COUNT

| Block # | NUMBER OF PAGES HAVING READ COUNT EXCEEDING REFERENCE VALUE |
|---|---|
| BLK1 | 7 |
| BLK2 | 4 |
| BLK3 | 15 |
| BLK4 | 11 |
| BLK5 | 19 |

MEMORY CONTROLLER AND OPERATING METHOD THEREOF

CROSS-REFERENCE TO RELATED APPLICATION

The present application claims priority under 35 U.S.C. § 119(a) to Korean patent application number 10-2019-0113717, filed on Sep. 16, 2019, which is incorporated herein by reference in its entirety.

BACKGROUND

Field of Invention

Various embodiments of the present disclosure relate generally to an electronic device, and more particularly, to a memory controller and an operating method thereof.

Description of Related Art

A storage device may store data in response to control of a host device such as a computer or a smartphone. A storage device may include a memory device storing data and a memory controller controlling the memory device. Memory devices are generally classified into volatile memory devices and nonvolatile memory devices.

Volatile memory devices may store data only when power is supplied thereto, and may lose stored data in the absence of a power supply. Examples of volatile memory devices include Static Random Access Memory (SRAM) and Dynamic Random Access Memory (DRAM).

Nonvolatile memory devices may retain stored data even in the absence of a power supply. Examples of nonvolatile memory devices include Read Only Memory (ROM), Programmable ROM (PROM), Electrically Programmable ROM (EPROM), Electrically Erasable and Programmable ROM (EEPROM), and flash memory.

SUMMARY

Various embodiments of the present disclosure are directed to a memory controller having an improved response time for an input/output request and increased use efficiency of Dynamic Random Access Memory (DRAM), and a method of operating the memory controller.

According to an embodiment, a memory controller controlling a memory device includes an available-time prediction component configured to perform a machine learning operation using a Recurrent Neural Network (RNN) model based on input/output request information about an input/output request input from a host, and to predict an idle time representing a time during which the input/output request is not expected to be input from the host and a data compression controller configured to generate, in response to the idle time longer than a set reference time, compressed map data by compressing map data which indicates a mapping relationship between a logical address provided by the host and a physical address indicating a physical location of a memory block included in the memory device.

According to an embodiment, a method of operating a memory controller may include receiving input/output request information from a host; predicting, based on machine learning using a Recurrent Neural Network (RNN) model, an idle time representing a time during which an input/output request is not expected to be input from the host; and compressing, when in response to the idle time is longer than a set reference time, map data which is mapping information of a logical address designating a logical location of a data block and a physical address designating a physical location of an actual data block.

According to an embodiment, a method of operating a memory controller for controlling a storage device including blocks, the operating method may include controlling, in response to access requests, the storage device to access the blocks; accumulating the access requests; predicting, by applying machine learning to the accumulated access requests, an idle time during which an access request is not expected to be received; and compressing map information related to select blocks during the idle time, wherein time required to compress the map information is shorter than the idle time.

DETAILED DESCRIPTION

Specific structural and functional features of the present invention are disclosed in the context of embodiments of the invention. However, the present invention may be configured or arranged differently than disclosed herein. Thus, the present invention is not limited to any particular embodiment nor to any specific details. Also, throughout the specification, reference to "an embodiment," "another embodiment" or the like is not necessarily to only one embodiment, and different references to any such phrase are not necessarily to the same embodiment. Moreover, the use of an indefinite article (i.e., "a" or "an") means one or more, unless it is clear that only one is intended. Similarly, terms "comprising," "Including," "having" and the like, when used herein, do not preclude the existence or addition of one or more other elements in addition to the stated element(s).

Hereinafter, various embodiments of the present disclosure are described in detail with reference to the accompanying drawings.

Figure 1:
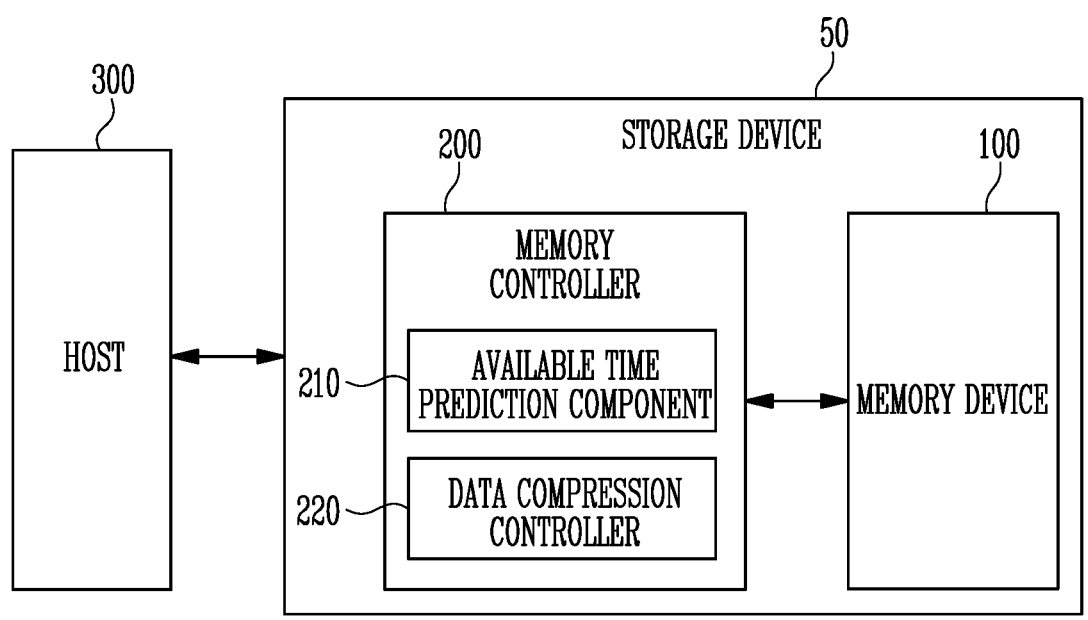
FIG. 1 is a diagram illustrating a storage device according to an embodiment of the present disclosure.

FIG. 1 is a diagram illustrating a storage device according to an embodiment of the present disclosure.

Referring to FIG. 1, a storage device 50 may include a memory device 100 and a memory controller 200. The storage device 50 may store data in response to control of a host 300. Examples of the storage device 50 include a cellular phone, a smartphone, an MP3 player, a laptop computer, a desktop computer, a game player, a TV, a tablet PC, and an in-vehicle infotainment system.

The storage device 50 may be configured as of various kinds of data storage devices depending on a host interface which is a communication method with the host 300. For example, the storage device 50 may be configured as a solid state drive (SSD), a multimedia card in the form of an MMC, an eMMC, an RS-MMC and a micro-MMC, a secure digital card in the form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, and/or a memory stick.

The storage device 50 may be manufactured as any of various types of packages. For example, the storage device 50 may be manufactured as a package-on-package (POP), a system-in-package (SIP), a system-on-chip (SOC), a multi-chip package (MCP), a chip-on-board (COB), a wafer-level fabricated package (WFP), and/or a wafer-level stack package (WSP).

The memory device 100 may store data. The memory device 100 may be operated in response to control of the memory controller 200. The memory device 100 may include a memory cell array including a plurality of memory cells storing data.

A memory cell may operate as a single-level cell (SLC) storing a single data bit, a multi-level cell (MLC) storing two data bits, a triple-level cell (TLC) storing three data bits, or a quad-level cell (QLC) storing four data bits.

The memory cell array may include a plurality of memory blocks. The memory block may include a plurality of memory cells. The memory block may be a unit for erasing data stored in the memory device 100. According to an embodiment, a memory block may include a plurality of pages. A page may be a unit for storing data in the memory device 100 or reading data stored in the memory device 100.

According to an embodiment, the memory device 100 may be Double Data Rate Synchronous Dynamic Random Access Memory (DDR SDRAM), Low Power Double Data Rate4 (LPDDR4) SDRAM, Graphics Double Data Rate (GDDR) SDRAM, Low Power DDR (LPDDR), Rambus Dynamic Random Access Memory (RDRAM), NAND flash memory, vertical NAND flash memory, NOR flash memory, resistive random access memory (RRAM), phase-change memory (PRAM), magnetoresistive random access memory (MRAM), ferroelectric random access memory (FRAM), or spin transfer torque random access memory (STT-RAM). By way of example, in the context of the following description, the memory device 100 is NAND flash memory.

The memory device 100 may be configured to receive a command and an address from the memory controller 200, and to access a region selected by the address in the memory cell array. That is, the memory device 100 may perform an operation corresponding to the received command on the region selected by the address. For example, the memory device 100 may perform a program operation, a read operation, and an erase operation. The program operation may be for storing data in memory cells in the memory device 100. The memory device 100 may perform a program operation for storing data in a region selected by an address according to a program command input from the memory controller 200. A read operation may be for sensing data stored in memory cells by using a read voltage. The memory device 100 may sense data stored in a region selected by an address according to a read command input from the memory controller 200. An erase operation may be for erasing data stored in memory cells. The memory device 100 may erase data stored in a region selected by an address according to an erase command input from the memory controller 200. According to an embodiment, erasing data stored in memory cells may refer to reducing a threshold voltage of the memory cells such that the threshold voltage of the memory cells is within a threshold voltage distribution corresponding to an erase state.

The memory controller 200 may control general operations of the memory device 100.

When power is applied to the storage device 50, the memory controller 200 may execute firmware (FW) previously stored.

The firmware (FW) may include a Host Interface Layer (HIL) receiving a request input from the host 300 or outputting a response to the host 300, a Flash Translation Layer (FTL) managing an operation between an interface of the host 300 and an interface of the memory device 100, and a Flash Interface Layer (FIL) providing a command to the memory device 100 or receiving a response from the memory device 100.

When a write request is input from the host 300, the memory controller 200 may receive data to be stored and a logical address (LA) for identifying the corresponding data from the host 300. The memory controller 200 may translate the received logical address into a physical address (PA) Indicating physical addresses of memory cells in which the data is to be stored among the memory cells in the memory device 100. The memory controller 200 may provide a program command for storing the data, a physical address, and the data to be stored to the memory device 100.

According to an embodiment, when a read request is input from the host 300, the memory controller 200 may receive a logical address from the host 300 for identifying data to be read from the memory device 100. The memory controller 200 may obtain a physical address corresponding to the received logical address, and may provide a read command and a physical address to the memory device 100.

According to an embodiment, the memory controller 200 may control the memory device 100 to perform a program operation, a read operation, or an erase operation itself independent of a request from the host 300. For example, the memory controller 200 may control the memory device 100 to perform background operations such as wear leveling, garbage collection, or read reclaim.

According to an embodiment, the memory controller 200 may include an available-time prediction component 210 and a data compression controller 220.

The available-time prediction component 210 may generate available-time prediction information by using input/output request information input from the host. More specifically, the available-time prediction component 210 may generate the available-time prediction information by using Recurrent Neural Network (RNN)-based machine learning. Machine learning is one field of artificial intelligence in which an algorithm is applied to a system to enable it to learn without explicit instructions, that is, based on empirical data, make predictions and improve its own performance through iterations. The available-time prediction component 210 may employ a Recurrent Neural Network (RNN) model among machine learning models.

Through machine learning, the available-time prediction component 210 may learn a time interval between received input/output requests and may predict an idle time during which input/output requests will not be input from the host. Idle time may be predicted on the basis of information about a set number of pieces of input/output request information that have already been received. An initially- or currently-predicted idle time may be changed or updated each time new input/output request information is received. The available-time prediction component 210 may further include information about a reference time which is an average time spent in compressing map data. The available-time prediction component 210 may compare a predicted idle time with the reference time to output available-time prediction information including information as to whether to compress map data. More specifically, when a predicted idle time is longer than the reference time, the predicted idle time may be determined as an available time during which map data may be compressed. When a predicted idle time is shorter than the reference time, the predicted idle time may not be considered an available time. The available-time prediction component 210 may generate available-time prediction information about whether a predicted idle time represents the available time and may provide the available-time prediction information to the data compression controller 220.

The data compression controller 220 may compress map data according to the available-time prediction information input from the available-time prediction component 210. More specifically, when a predicted idle time is the available time, the data compression controller 220 may compress map data at the predicted idle time. Alternatively, when a predicted idle time is not the available time, the data compression controller 220 may omit compression of map data.

The data compression controller 220 may determine map data to be compressed using block information before compressing map data. For example, block information may include the number of valid pages or a read count. A Garbage Collection (GC) operation may be more likely to be performed in a block including fewer valid pages, and a read reclaim operation may be more likely to be performed in a block including more pages, each of which has a relatively high read count. Accordingly, because map data about a memory block including fewer valid pages or a memory block with more high read count pages may change soon, it may be inefficient to compress this data. Accordingly, when a memory block includes valid pages, the number of which is less than a reference number, or includes more high read count pages than a reference count, map data about this memory block may not be considered a target of a data compress operation.

The data compression controller 220 may compress map data by using any of various compressing methods when it is determined that a predicted idle time represents the available time and the map data corresponds to a target of compression. The various compressing methods may include a delta compression method or a GZIP method. However, other methods may be used. Processes of compressing map data are described below.

The host 300 may communicate with the storage device 50 using at least one of various communication methods such as a Universal Serial Bus (USB), Serial AT Attachment (SATA), a Serial Attached SCSI (SAS), a High Speed Interchip (HSIC), a Small Computer System Interface (SCSI), a Peripheral Component Interconnection (PCI), PCI express (PCIe), NonVolatile Memory express (NVMe), Universal Flash Storage (UFS), Secure Digital (SD), a MultiMedia Card (MMC), an embedded MMC (eMMC), a Dual In-line Memory Module (DIMM), a Registered DIMM (RDIMM), and/or a Load Reduced DIMM (LRDIMM).

Figure 2:
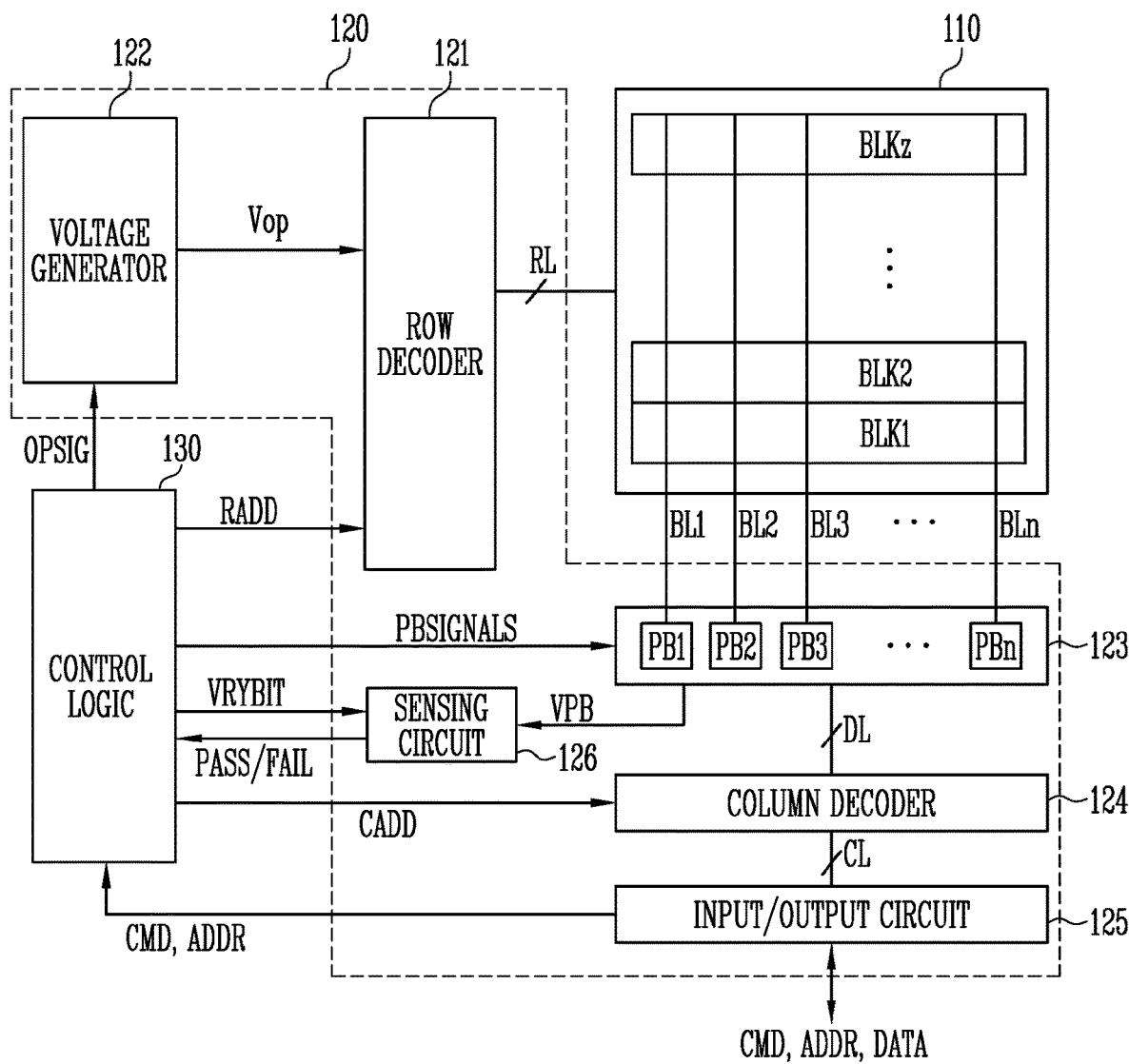
FIG. 2 is a diagram illustrating a structure of a memory device shown in FIG. 1.

FIG. 2 is a diagram illustrating a structure of the memory device 100 shown in FIG. 1.

Referring to FIG. 2, the memory device 100 may include a memory cell array 110, a peripheral circuit 120, and control logic 130.

The memory cell array 110 may include a plurality of memory blocks BLK1 to BLKz. The plurality of memory blocks BLK1 to BLKz may be coupled to a row decoder 121 through row lines RL. The plurality of memory blocks BLK1 to BLKz may be coupled to a read and write circuit 123 through bit lines BL1 to BLm. Each of the plurality of memory blocks BLK1 to BLKz may include a plurality of memory cells. According to an embodiment, the plurality of memory cells may be nonvolatile memory cells. Memory cells coupled to the same word line, among the plurality of memory cells, may be defined to form a single physical page. Accordingly, each memory block may include a plurality of physical pages. A single memory cell in a memory block may be any of a single-level cell (SLC) storing 1 bit of data, a multi-level cell (MLC) storing 2 bits of data, a triple-level cell (TLC) storing 3 bits of data, or a quad-level cell (QLC) storing 4 bits of data.

The peripheral circuit 120 may include the row decoder 121, a voltage generator 122, the read and write circuit 123, a column decoder 124, an input/output circuit 125, and a sensing circuit 126.

The peripheral circuit 120 may drive the memory cell array 110. For example, the peripheral circuit 120 may drive the memory cell array 110 to perform a program operation, a read operation, and an erase operation.

The voltage generator 122 may generate a plurality of operating voltages Vop by using an external power voltage supplied to the memory device 100. The voltage generator 122 may operate in response to the control of the control logic 130. More specifically, the voltage generator 122 may generate the operating voltages Vop used for a program operation, a read operation, and erase operations in response to an operating signal OPSIG. For example, the voltage generator 122 may generate a program voltage, a verify voltage, a program pass voltage, a verify pass voltage, a read voltage, an erase voltage, and the like according to the control of the control logic 130.

According to an embodiment, the voltage generator 122 may include a plurality of pumping capacitors for generating the plurality of operating voltages Vop having various voltage levels. The voltage generator 122 may generate the plurality of operating voltages Vop by selectively activating the plurality of pumping capacitors in response to the control of the control logic 130. The plurality of generated operating voltages Vop may be supplied to the memory cell array 110 by the row decoder 121.

The row decoder 121 may be coupled to the memory cell array 110 through the row lines RL. The row lines RL may include drain select lines, word lines, source select lines, and a common source line. According to various embodiments, the word lines may include normal word lines and dummy word lines. In addition, the row lines RL may further include a pipe select line.

The row decoder 121 may operate in response to the control of the control logic 130. The row decoder 121 may transfer the operating voltages Vop generated by the voltage generator 122 to the row lines RL coupled to a selected memory block, among the plurality of memory blocks BLK1 to BLKz, in response to a row address RADD from the control logic 130.

The read and write circuit 123 may include first to nth page buffers PB1 to PBn, which may be coupled to the memory cell array 110 through the first to nth bit lines BL1 to BLn, respectively. The first to nth page buffers PB1 to PBn may operate in response to the control of the control logic 130. For example, the first to nth page buffers PB1 to PBn may operate in response to page buffer control signals PBSIGNALS.

According to an embodiment, the first to nth page buffers PB1 to PBn may sense data stored in the memory cell array 110 by sensing a voltage or a current of the first to nth bit lines BL1 to BLn. The first to nth page buffers PB1 to PBn may temporarily store the sensed data. The first to nth page buffers PB1 to PBn may provide the column decoder 124 with the sensed data through data lines DL.

According to an embodiment, the first to nth page buffers PB1 to PBn may receive data to be stored from the input/output circuit 125 through the column decoder 124 and the data lines DL. The data that the first to nth page buffers PB1 to PBn received by performing a program operation may be stored in the memory cell array 110.

The program operation of storing data in a memory cell may include applying a program voltage and verifying the program operation. In applying the program voltage, the first to nth page buffers PB1 to PBn may transfer data to be stored to selected memory cells when the program voltage is applied to a selected word line. A memory cell coupled to a bit line to which a program permission voltage (for example, a ground voltage) is applied may have an increased threshold voltage. A threshold voltage of a memory cell coupled to a bit line to which a program inhibition voltage (for example, a power voltage) is applied may be maintained. In verifying the program operation, the first to nth page buffers PB1 to PBn may sense data stored in the selected memory cells through the bit lines BL1 to BLn.

The sensing circuit 126 may generate a reference current in response to an allowable bit VRYBIT and compare a sensing voltage VPB received from the read and write circuit 123 with a reference voltage generated by the reference current to output a pass signal PASS or a fail signal FAIL in verifying the program operation.

The input/output circuit 125 may be coupled to the first to nth page buffers PB1 to PBn through the column decoder 124 and the data lines DL. The input/output circuit 125 may operate in response to the control of the control logic 130.

The input/output circuit 125 may transfer a command CMD and an address ADDR received from the memory controller 200 shown in FIG. 1 to the control logic 130 or provide the read and write circuit 123 with data DATA received from the memory controller 200 shown in FIG. 1.

According to an embodiment, the input/output circuit 125 may include a plurality of input/output buffers (not illustrated) receiving the data DATA. During a program operation, the input/output circuit 125 may receive the data DATA to be stored from the memory controller 200. During a read operation, the input/output circuit 125 may output data, which is transferred from the first to nth page buffers PB1 to PBn in the read and write circuit 123, to the memory controller 200.

The control logic 130 may be coupled to the row decoder 121, the voltage generator 122, the read and write circuit 123, the column decoder 124, the input/output circuit 125, and the sensing circuit 126. The control logic 130 may be configured to control the general operations of the memory device 100.

The control logic 130 may generate a plurality of control signals for controlling the peripheral circuit 120 in response to the command CMD and the address ADDR. For example, the control logic 130 may generate the operating signal OPSIG, the row address RADD, the page buffer control signals PBSIGNALS and the allowable bit VRYBIT in response to the command CMD and the address ADDR. The control logic 130 may determine whether a verify operation passes or falls in response to the pass or fail signal PASS/FAIL output by the sensing circuit 126.

Figure 3:
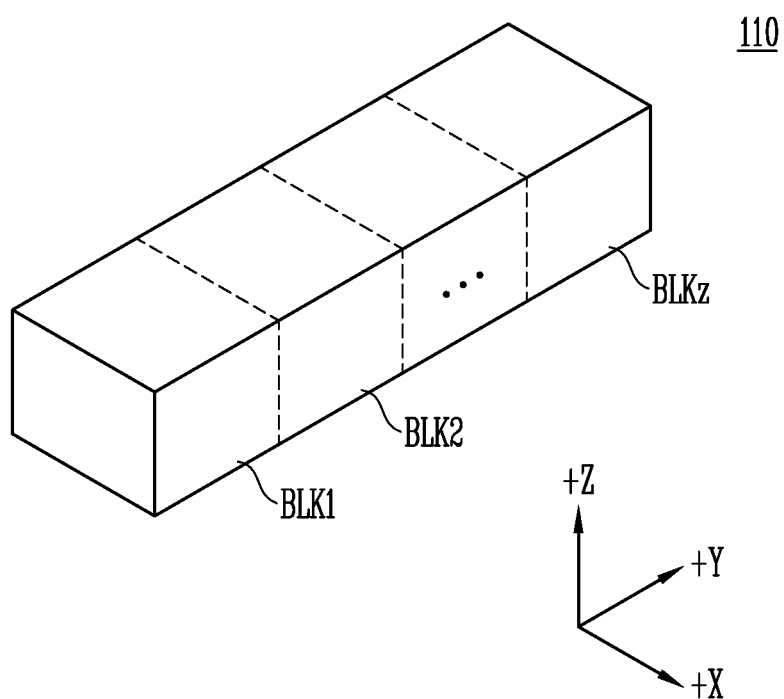
FIG. 3 is a diagram illustrating an embodiment of a memory cell array shown in FIG. 2.

FIG. 3 is a diagram illustrating an embodiment of the memory cell array 110 shown in FIG. 2.

Referring to FIG. 3, the memory cell array 110 may include the plurality of memory blocks BLK1 to BLKz. Each memory block may have a three-dimensional structure. Each memory block may include a plurality of memory cells stacked on a substrate. The plurality of memory cells may be arranged in a +X direction, a +Y direction, and a +Z direction, as shown in FIG. 3. The structure of each memory block is described in detail below with reference to FIGS. 4 and 5.

Figure 4:
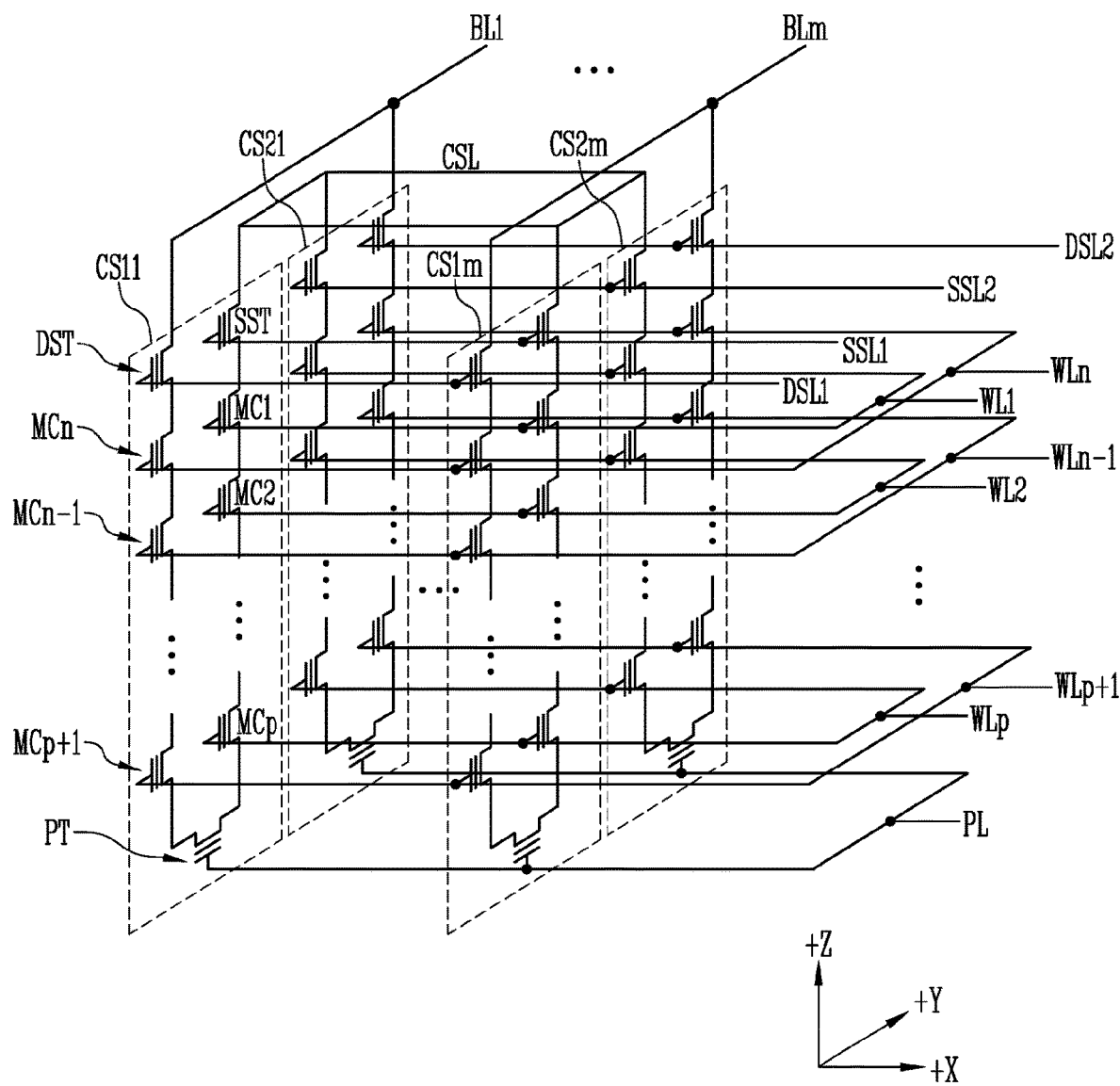
FIG. 4 is a circuit diagram illustrating one (BLKa) of the memory blocks BLK1 to BLKz shown in FIG. 3.

FIG. 4 is a circuit diagram illustrating one (BLKa) of the memory blocks BLK1 to BLKz shown in FIG. 3.

Referring to FIG. 4, the memory block BLKa may include a plurality of cell strings CS11 to CS1m and CS21 to CS2m. According to an embodiment, each of the plurality of cell strings CS11 to CS1m and CS21 to CS2m may be formed in a U shape. In the memory block BLKa, m cell strings may be arranged in a row direction (i.e., the +X direction). In FIG. 4, it is illustrated that two cell strings are arranged in a column direction (i.e., the +Y direction). However, this is merely an example; three or more cell strings may be arranged in the column direction.

Each of the plurality of cell strings CS11 to CS1m and CS21 to CS2m may include at least one source select transistor SST, first to nth memory cells MC1 to MCn, a pipe transistor PT, and at least one drain select transistor DST.

Each of the select transistors SST and DST and each of the memory cells MC1 to MCn may have a similar structure. According to an embodiment, each of the select transistors SST and DST and the memory cells MC1 to MCn may include a channel layer, a tunneling insulating layer, a charge storage layer, and a blocking insulating layer. According to an embodiment, a pillar for providing a channel layer may be provided to each cell string. According to an embodiment, a pillar for providing at least one of the channel layer, the tunneling insulating layer, the charge storage layer, and the blocking insulating layer may be provided to each cell string.

The source select transistor SST of each cell string may be coupled between a common source line CSL and the memory cells MC1 to MCp.

According to an embodiment, source select transistors of cell strings arranged in the same row may be coupled to a source select line extending in a row direction, and source select transistors of cell strings arranged in different rows may be coupled to different source select lines. In FIG. 4, source select transistors of the cell strings CS11 to CS1m in the first row may be coupled to a first source select line SSL1. Source select transistors of the cell strings CS21 to CS2m in the second row may be coupled to a second source select line SSL2.

According to another embodiment, source select transistors of the cell strings CS11 to CS1m and CS21 to CS2m may be coupled in common to one source select line.

The first to nth memory cells MC1 to MCn of each cell string may be coupled between the source select transistor SST and the drain select transistor DST.

The first to nth memory cells MC1 to MCn may be classified into first to pth memory cells MC1 to MCp and (p+1)th to nth memory cells MCp+1 to MCn. The first to pth memory cells MC1 to MCp may be sequentially arranged in the −Z direction and may be coupled in series between the source select transistor SST and the pipe transistor PT. The (p+1)th to nth memory cells MCp+1 to MCn may be sequentially arranged in the +Z direction and may be coupled in series between the pipe transistor PT and the drain select transistor DST. The first to pth memory cells MC1 to MCp and the (p+1)th to nth memory cells MCp+1 to MCn may be coupled through the pipe transistor PT. Gates of the first to nth memory cells MC1 to MCn of each cell string may be coupled to first to nth word lines WL1 to WLn, respectively.

A gate of the pipe transistor PT of each cell string may be coupled to a pipe line PL.

The drain select transistor DST of each cell string may be coupled between the corresponding bit line and the memory cells MCp+1 to MCn. Cell strings arranged in the row direction may be coupled to a drain select line extending in the row direction. Drain select transistors of the cell strings CS11 to CS1m in the first row may be coupled to a first drain select line DSL1. Drain select transistors of the cell strings CS21 to CS2m in the second row may be coupled to a second drain select line DSL2.

Cell strings arranged in the column direction may be coupled to a bit line extending in the column direction. In FIG. 4, the cell strings CS11 and CS21 in the first column may be coupled to the first bit line BL1. The cell strings CS1m and CS2m in the mth column may be coupled to the mth bit line BLm.

Memory cells coupled to the same word line, in cell strings arranged in the row direction, may form a single page. For example, memory cells coupled to the first word line WL1, in the cell strings CS11 to CS1m in the first row, may form a single page. Memory cells coupled to the first word line WL1, in the cell strings CS21 to CS2m in the second row, may form another single page. When one of the drain select lines DSL1 and DSL2 is selected, cell strings arranged in one row direction may be selected. When one of the first to nth word lines WL1 to WLn is selected, one page may be selected from the selected cell strings.

In another embodiment, even bit lines and odd bit lines may be provided instead of the first to mth bit lines BL1 to BLm. In addition, even-numbered cell strings among the cell strings CS11 to CS1m or CS21 to CS2m arranged in the row direction may be coupled to even bit lines, respectively, and odd-numbered cell strings among the cell strings CS11 to CS1m or CS21 to CS2m arranged in the row direction may be coupled to odd bit lines, respectively.

According to an embodiment, at least one of the first to nth memory cells MC1 to MCn may serve as a dummy memory cell. For example, dummy memory cell(s) may be provided to reduce an electric field between the source select transistor SST and the memory cells MC1 to MCp. Alternatively, dummy memory cell(s) may be provided to reduce an electric field between the drain select transistor DST and the memory cells MCp+1 to MCn. When more dummy memory cells are provided, the operational reliability of the memory block BLKa may be improved, but the size of the memory block BLKa may increase. On the contrary, when fewer dummy memory cells are provided, the size of the memory block BLKa may be reduced, but the operational reliability of the memory block BLKa may be degraded.

To efficiently control the dummy memory cell(s), each dummy memory cell may have a required threshold voltage. Before or after an erase operation on the memory block BLKa is performed, program operations on all or some of the dummy memory cells may be performed. When an erase operation is performed after a program operation is performed, the dummy memory cells may have required threshold voltages by controlling a voltage applied to dummy word lines coupled to the respective dummy memory cells.

Figure 5:
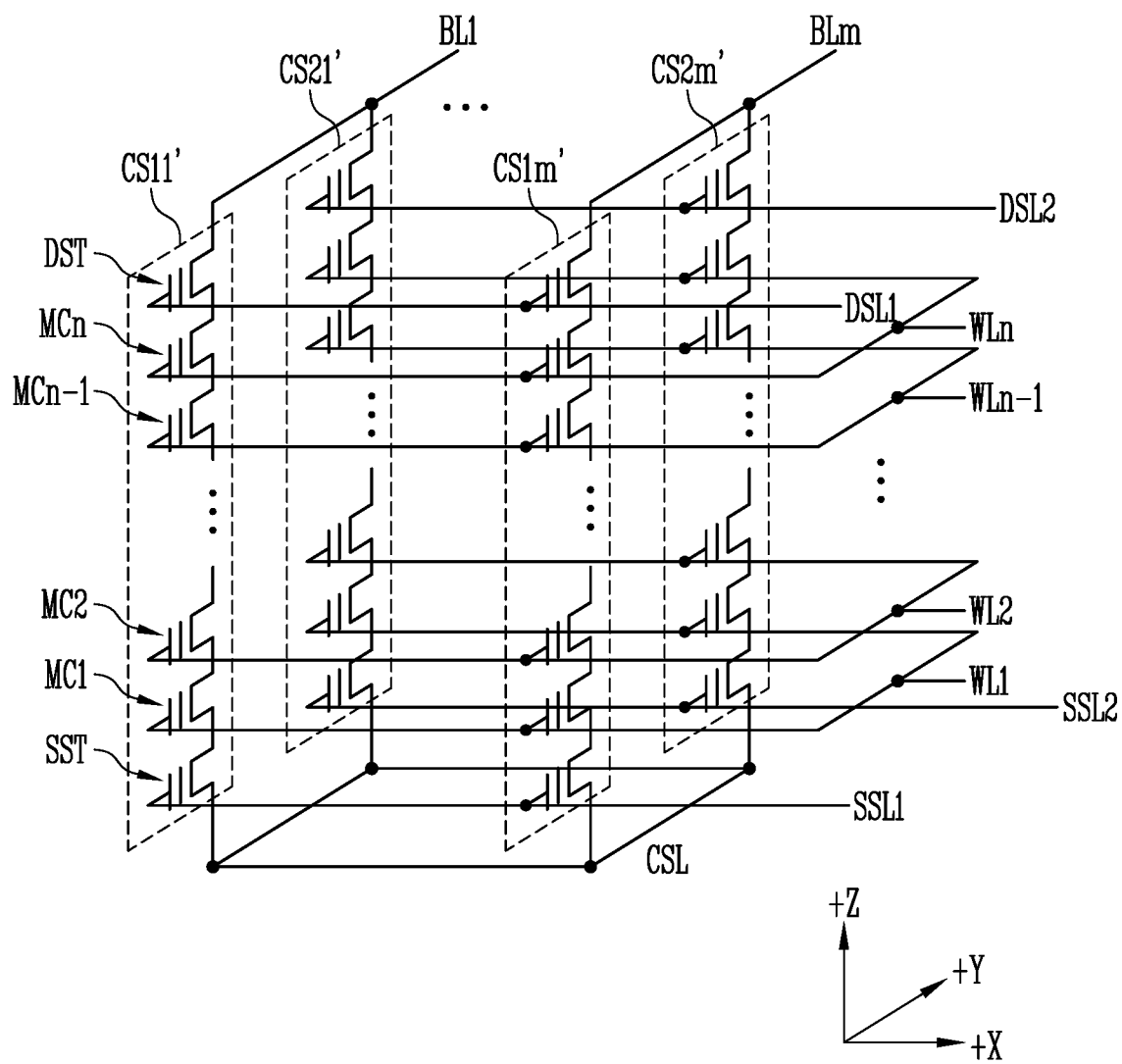
FIG. 5 is a circuit diagram illustrating another embodiment of one (BLKb) of the memory blocks BLK1 to BLKz shown in FIG. 3.

FIG. 5 is a circuit diagram illustrating another embodiment of one (BLKb) of the memory blocks BLK1 to BLKz shown in FIG. 3.

Referring to FIG. 5, the memory block BLKb may include a plurality of cell strings CS11' to CS1m' and CS21' to CS2m'. Each of the plurality of cell strings CS11' to CS1m' and CS21' to CS2m' may extend in the +Z direction. Each of the plurality of cell strings CS11' to CS1m' and CS21' to CS2m' may include at least one source select transistor SST, the first to nth memory cells MC1 to MCn, and at least one drain select transistor DST, which are stacked on a substrate (not illustrated) under a memory block BLK1'.

The source select transistor SST of each cell string may be coupled between the common source line CSL and the first to nth memory cells MC1 to MCn. Source select transistors of cell strings arranged in the same row may be coupled to the same source select line. Source select transistors of the cell strings CS11' to CS1m' arranged in the first row may be coupled to the first source select line SSL1. Source select transistors of the cell strings CS21' to CS2m' arranged in the second row may be coupled to the second source select line SSL2. According to another embodiment, the source select transistors of the cell strings CS11' to CS1m' and CS21' to CS2m' may be coupled in common to a single source select line.

The first to nth memory cells MC1 to MCn of each of the cell strings may be coupled in series between the source select transistor SST and the drain select transistor DST. Gates of the first to nth memory cells MC1 to MCn may be coupled to the first to nth word lines WL1 to WLn, respectively.

The drain select transistor DST of each of the cell strings may be coupled between the corresponding bit line and the memory cells MC1 to MCn. Drain select transistors of cell strings arranged in the row direction may be coupled to a drain select line extending in the row direction. Drain select transistors of the cell strings CS11' to CS1m' in the first row may be coupled to the first drain select line DSL1. Drain select transistors of the cell strings CS21' to CS2m' in the second row may be coupled to the second drain select line DSL2.

Accordingly, the memory block BLKb shown in FIG. 5 may have a similar equivalent circuit to the memory block BLKa shown in FIG. 4 except that the pipe transistor PT is removed from each of the cell strings of the memory block BLKb.

In another embodiment, even bit lines and odd bit lines may be provided instead of the first to mth bit lines BL1 to BLm. In addition, even-numbered cell strings among the cell strings CS11' to CS1m' or CS21' to CS2m' arranged in the row direction may be coupled to the even bit lines, respectively, and odd-numbered cell strings among the cell strings CS11' to CS1m' or CS21' to CS2m' arranged in the row direction may be coupled to the odd bit lines, respectively.

According to an embodiment, at least one of the first to nth memory cells MC1 to MCn may serve as a dummy memory cell. For example, dummy memory cell(s) may be provided to reduce an electric field between the source select transistor SST and the memory cells MC1 to MCn. Alternatively, dummy memory cell(s) may be provided to reduce an electric field between the drain select transistor DST and the memory cells MC1 to MCn. When more dummy memory cells are provided, the operational reliability of the memory block BLKb may be improved, but the size of the memory block BLKb may increase. On the contrary, when fewer dummy memory cells are provided, the size of the memory block BLKb may be reduced, but the operational reliability of the memory block BLKb may be degraded.

To efficiently control the dummy memory cell(s), each dummy memory cell may have a required threshold voltage. Before or after an erase operation on the memory block BLKb is performed, program operations on all or some of the dummy memory cells may be performed. When an erase operation is performed after a program operation is performed, the dummy memory cells may have required threshold voltages by controlling a voltage applied to dummy word lines coupled to the respective dummy memory cells.

Figure 6:
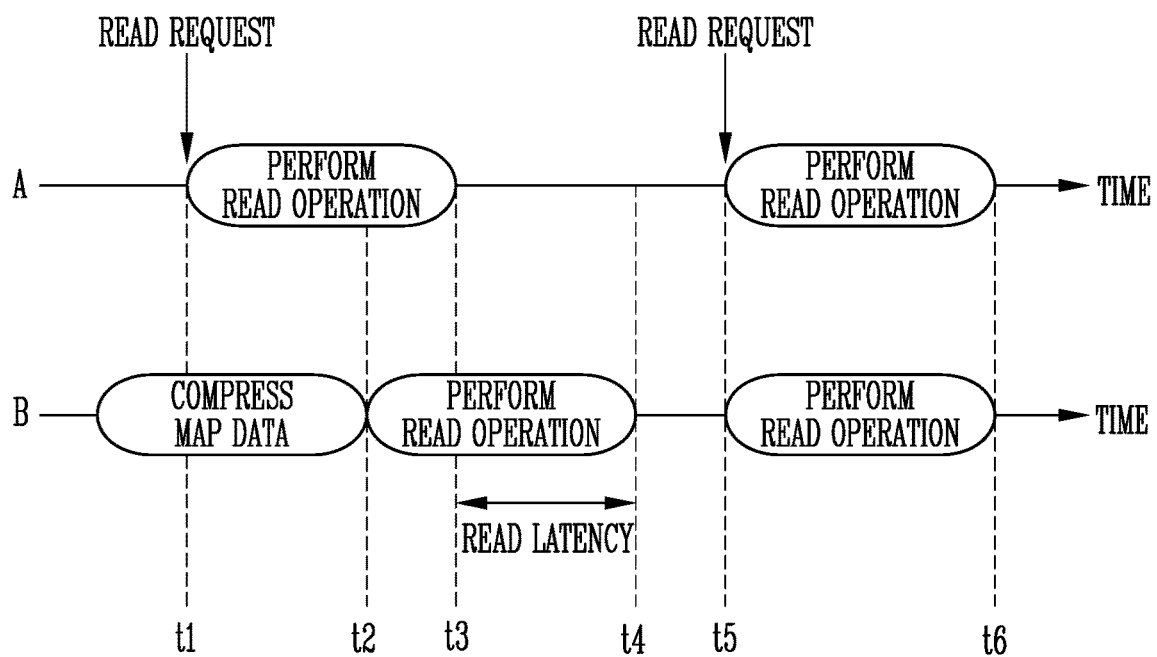
FIG. 6 is a diagram illustrating an operation of a memory controller according to an embodiment of the present disclosure.

FIG. 6 is a diagram illustrating an operation of a memory controller according to an embodiment of the present disclosure.

In particular, FIG. 6 illustrates an operation of a memory controller which performs a read operation in response to a read request input from a host. More specifically, "A" illustrates a timing diagram in which only a read request input from a host is processed, and "B" illustrates a timing diagram in which the read request input from the host and compression of map data are processed.

Referring to "A", a read request may be input from a host at t. A memory controller may perform a read operation in response to the input read request, read operation may direct an associated memory device to sense data stored in memory cells by using a read voltage.

The read operation corresponding to the read request input at t1 may finish at t3. Thereafter, when a next read request is input from the host at t5, the memory controller may perform the read operation, which may finish at t6.

"B" corresponds to a case where a read request is input when map data stored in a memory controller is compressed. When the read request is input from the host at t, while the memory controller compresses the map data, a read operation might not be immediately performed; Instead, the memory controller may wait until t2, at which time the compression of the map data is finished. The read operation started at t2 is finished at t4.

When a read request is input while map data is being compressed, performance of the corresponding read operation may be delayed until the compression of the map data finishes. Accordingly, additional read latency may occur. In other words, according to "B", a read request input from a host might not be processed until compression of corresponding map data finishes. Accordingly, additional read latency of t3-t4 may occur in "B" compared to "A" in which only a read request input from a host is processed.

Figure 7:
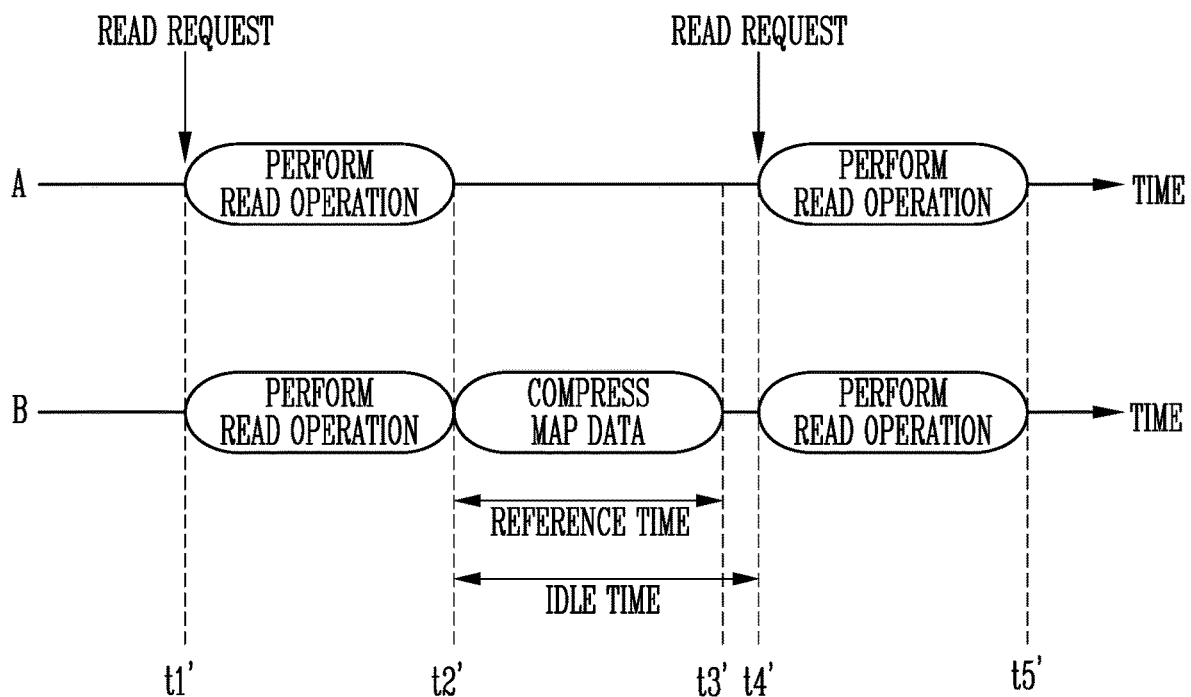
FIG. 7 is a diagram illustrating an operation of a memory controller according to an embodiment of the present disclosure.

FIG. 7 is a diagram illustrating an operation of a memory controller according to an embodiment of the present disclosure.

Referring to FIG. 7, "A" illustrates a timing diagram in which only a read request input from a host is processed, and "B" Illustrates a timing diagram in which the read request input from the host and compression of map data are processed.

Referring to "B", a read request may be input from a host at t1'. A memory controller may immediately perform a read operation in response to the input read request. Thereafter, the read operation may finish at t2'. The memory controller may have an idle time, during which an input/output request is not input from the host, between the time that read operation finishes (t2') and the time that a next read request is input at t4'. The idle time may be predicted, by performing machine learning based on input/output request information input from the host before t1'. More specifically, the machine learning may be performed using a Recurrent Neural Network (RNN) model.

An average time spent compressing the map data may correspond to a reference time. The memory controller may compress the map data stored in map data storage during the reference time. The reference time may be defined as various times other than the average time for compressing map data. For example, according to another embodiment the reference time may be defined as the median time spent compressing the map data. The memory controller may determine whether to compress the map data by comparing the reference time with the idle time after performance of the read operation finishes at t2'. When the idle time is shorter than the reference time, compression of the map data may be omitted because compression of the map data might not finish until a next read request is input. On the contrary, when the idle time is longer than the reference time, the map data may be compressed during the predicted idle time because compression of the map data may finish before a next read request is input. FIG. 7 illustrates a case where a reference time is shorter than an idle time. Accordingly, at t2', performance of a read operation may finish and compression of map data may start. At t3', the compression of the map data may finish, and then at t4', a new read operation may be performed in response to a next read request.

According to the embodiment illustrated in FIG. 7, compared to the embodiment illustrated in FIG. 6, a memory controller may perform machine learning based on input/output request information and may compress the map data within a predicted idle time. Accordingly, the additional read latency, which occurs because the read operation is delayed until the compression of the map data finishes, may be minimized or eliminated.

Figure 8:
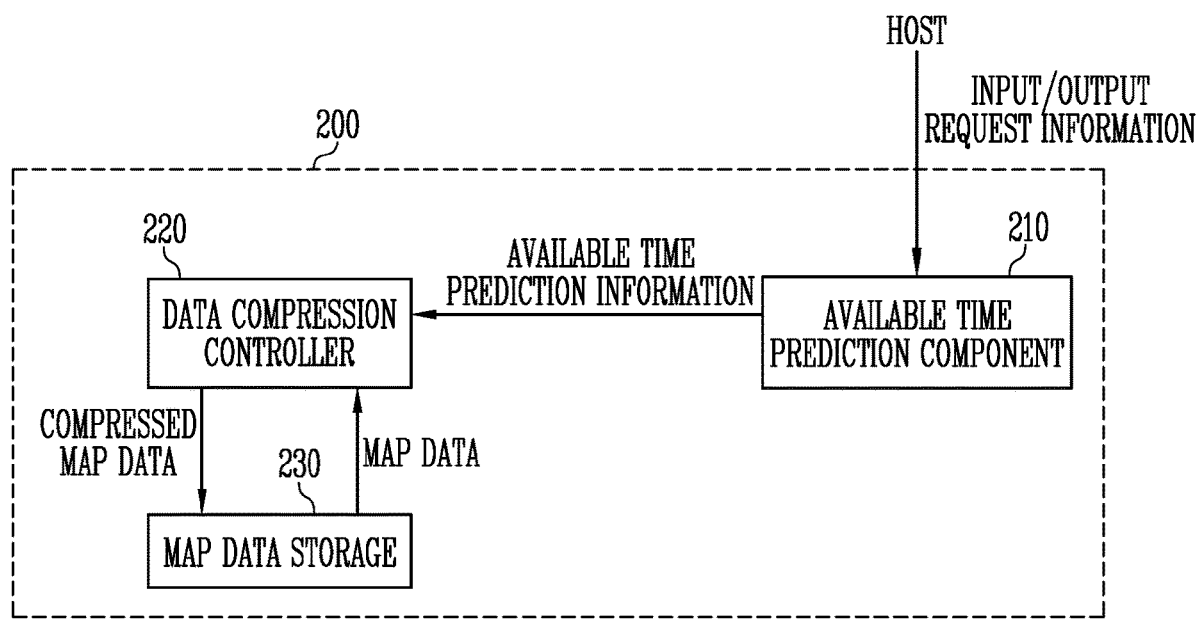
FIG. 8 is a block diagram illustrating an operation of a memory controller according to an embodiment of the present disclosure.

FIG. 8 is a block diagram illustrating an operation of a memory controller according to an embodiment of the present disclosure.

Referring to FIG. 8, the memory controller 200 may include the available-time prediction component 210, the data compression controller 220, and map data storage 230.

The available-time prediction component 210 may receive input/output request information from a host and generate available-time prediction information. The available-time prediction information may include information as to whether the data compression controller 220 is to compress map data. More specifically, the available-time prediction information may include a result obtained by comparing a predicted idle time, which represents a time during which an input/output request is not expected to be input from the host, with a reference time that represents the average time spent in compressing the map data. The available-time prediction component 210 may predict the idle time using machine learning. More specifically, the available-time prediction component 210 may use a Recurrent Neural Network (RNN) model among machine learning models.

The data compression controller 220 may compress the map data stored in the map data storage 230 according to the available-time prediction information input from the available-time prediction component 210. When an idle time predicted by the available-time prediction information through application of machine learning is to be considered an available time (based on the comparison described above), the data compression controller 220 may compress map data. When the machine-learning-driven predicted idle time is not to be considered the available time (based on the comparison described above), compression of map data may be omitted. Various compressing methods including a delta compression method and a GZIP method may be used to compress map data. Subsequently, the data compression controller 220 may store the compressed map data in the map data storage 230.

The map data storage 230 may store map data which corresponds to mapping information of a logical address and a physical address of a data block. The logical address may correspond to an address for a host to designate a logical location of a data block managed by the host. The physical address may correspond to an address for a memory controller to designate a physical location of an actual data block of a memory device.

Figure 9:
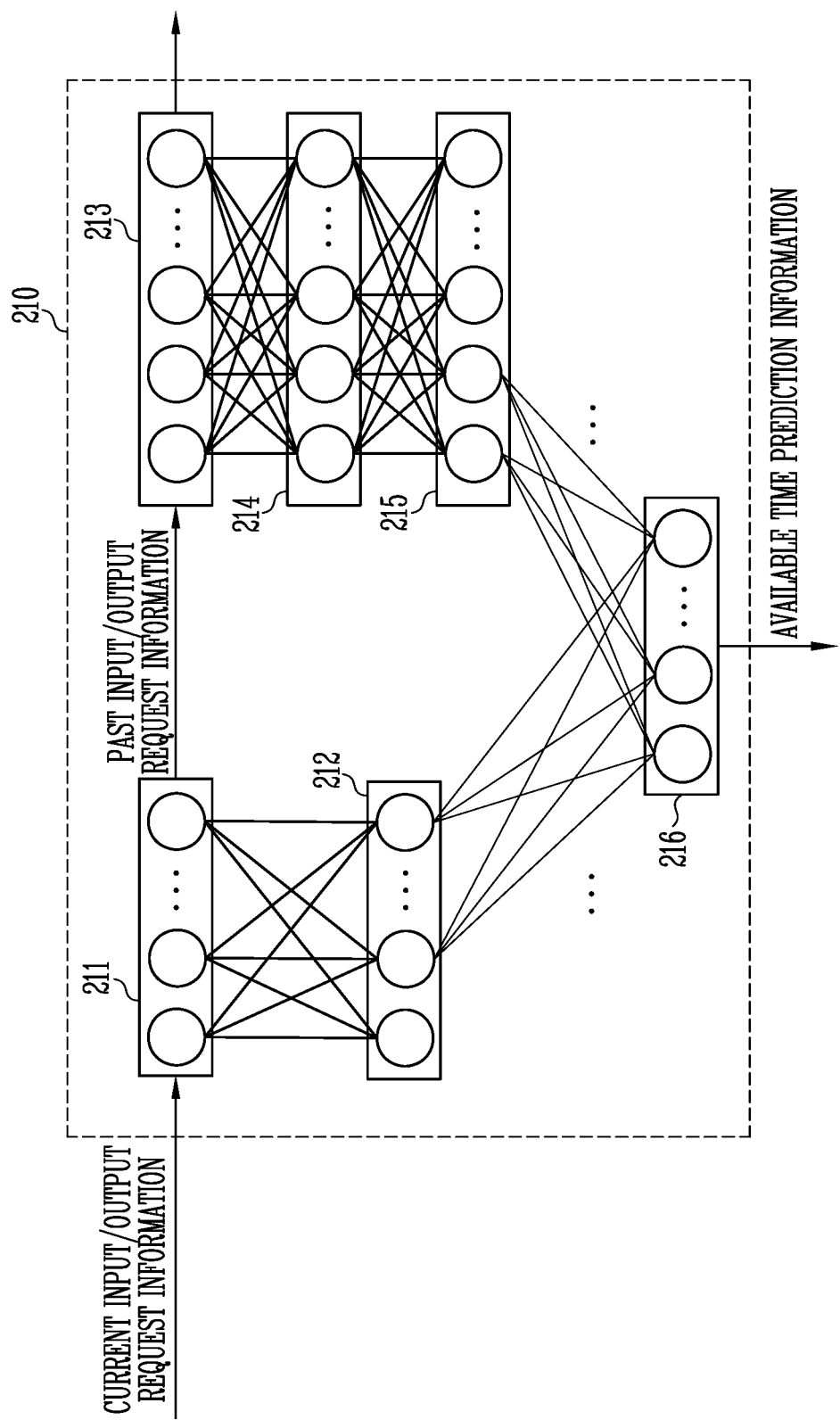
FIG. 9 is a diagram illustrating an operation of an available-time prediction component shown in FIG. 8.

FIG. 9 is a diagram illustrating an operation of the available-time prediction component 210 shown in FIG. 8.

Referring to FIG. 9, the available-time prediction component 210 may include a first preprocessing component 211, a first information processing component 212, a second preprocessing component 213, a second information processing component 214, a third information processing component 215, and a fourth information processing component 216.

The available-time prediction component 210 may generate available-time prediction information by using Recurrent Neural Network (RNN)-based machine learning. Thus, each output value of an RNN structure may be affected not only by a current input value but also by prediction results of previous input values. A Long Short Term Memory (LSTM) method, which is a type of RNN, may have characteristics to retain data without losing it even data obtained a relatively long time ago by a deeper layer. In other words, the LSTM may be designed with long-term memory or short-term memory. According to an embodiment of the present disclosure, input/output request information may be collected by the plurality of preprocessing components 211 and 213 and machine learning may be applied to predict an idle time, during which an input/output request is not expected to be input from a host, by using the plurality of information processing components 212, 214, 215, and 216 to which LSTM is applied.

The first preprocessing component 211 may store current input/output request information which corresponds to input/output request information that is input immediately before the available-time prediction information is generated. The first preprocessing component 211 may process the current input/output request information to optimize for application of an RNN machine learning model.

The second preprocessing component 213 may store past input/output request information that is input from the first preprocessing component 211. The past input/output request information is input before the current input/output request information is input from a host. The second preprocessing component 213 may perform an operation for processing the past input/output request information to be optimized to an RNN machine learning model.

The first information processing component 212 may perform machine learning on the current input/output request information stored in the first preprocessing component 211. Nodes of the first information processing component 212 may be a fully connected layer in which all of its nodes are connected to all of the nodes of the first preprocessing component 211, the previous layer.

The second information processing component 214 may perform machine learning on the current input/output request information stored in the second preprocessing component 213. Nodes of the second information processing component 214 may be a fully connected layer in which all of its nodes are connected to all of the nodes of the second preprocessing component 213, the previous layer.

The third information processing component 215 may perform machine learning on the past input/output request information, which is input from the second information processing component 214 and to which the primary machine learning is performed. Nodes of the third information processing component 215 may be a fully connected layer in which all of its nodes are connected to all of the nodes of the second information processing component 214, the previous layer.

The fourth information processing component 216 may perform machine learning on the past input/output request information and on the current input/output request information on which the machine learning is performed. Nodes of the fourth information processing component 216 may be a fully connected layer in which all of its nodes are connected to all of the nodes of the third information processing component 215 and all of the nodes of the first information processing component 212, the previous layers. The fourth information processing component 216 may generate available-time prediction information by comparing an idle time predicted by recurrent machine learning with a set reference time. The available-time prediction information may include information about whether the predicted idle time is to be used as the available time during which compression of map data may be performed. When the predicted idle time is longer than the reference time, information indicating that the predicted idle time is to be used as an available time for compression may be generated. When the predicted idle time predicted is shorter than the reference time, information indicating that the predicted idle time is not to be used as the available time, i.e., not to be used for a compression operation, may be generated.

FIG. 9 illustrates that the available-time prediction component 210 includes two preprocessing components (211, 213) and four information processing components (212, 214, 215, 216). However, the present invention is not limited to this arrangement. Other suitable arrangements of different depths may be used.

Figures 10, 11:
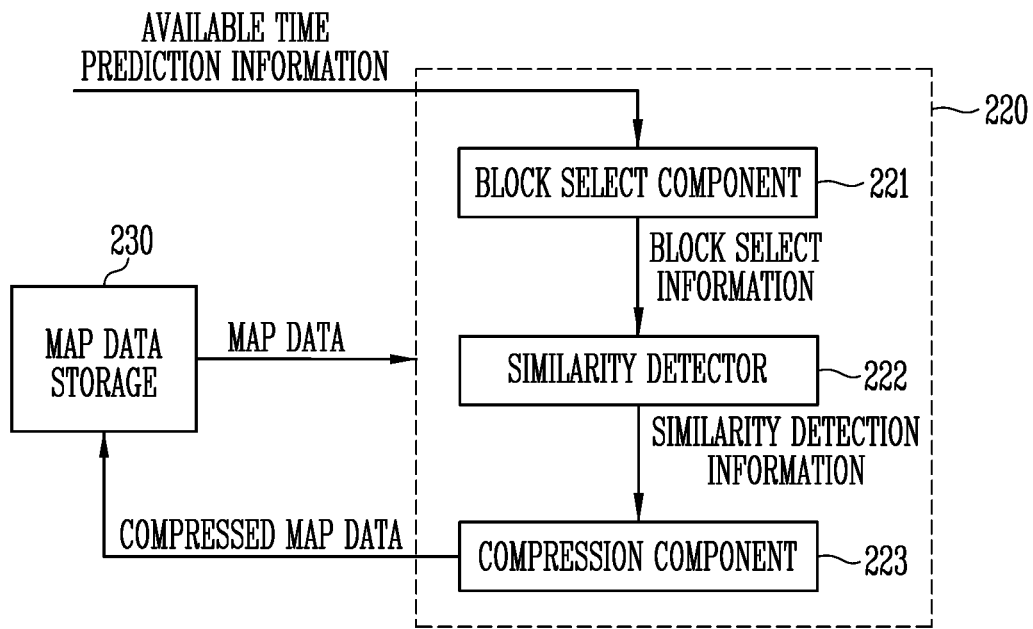
FIG. 10 is a diagram illustrating an operation of a data compression controller shown in FIG. 8.
FIG. 11 is a diagram illustrating an embodiment of a block select component.

FIG. 10 is a diagram illustrating an operation of the data compression controller 220 shown in FIG. 8.

Referring to FIG. 10, the data compression controller 220 may include a block select component 221, a similarity detector 222, and a compression component 223.

The data compression controller 220 may receive map data from the map data storage 230 and may output compressed map data to the map data storage 230.

More specifically, the block select component 221 may receive available-time prediction information, which is information about whether map data is compressed, from the available-time prediction component 210. According to the available-time prediction information, when an idle time represents an available time for compression, it may be determined whether corresponding map data is a target of compression based on block information that the map data designates. The block select component 221 may store block information of a memory block that the map data designates. For example, block information may indicate the number of valid pages or the number of pages each having a read count greater than a reference value.

The similarity detector 222 may receive block select information from the block select component 221 and may output similarity detection information of map data which is the target of compression. The similarity detection information may indicate a difference among pieces of data. According to a delta compression method, data may be compressed by representing differences between pieces of sequential data. Accordingly, when a difference among pieces of data is small, the delta compression method may reduce redundancy among data and may reduce a size of data to be stored.

The compression component 223 may compress map data according to similarity detection information output from the similarity detector 222. The compression component 223 may perform a compress operation by various compressing methods including a delta compression method and a GZIP method. The compression component 223 may not perform delta compression according to similarity detection information. For example, when a difference between pieces of map data is greater than a set reference value, a size of data compressed by a delta compression method might not be small enough. Accordingly, the delta compression method may not be performed. According to an embodiment, various compressing methods including a delta compression method or a GZIP method may be selectively performed. According to an embodiment, various compressing methods may be performed in an overlapping manner.

FIG. 11 is a diagram illustrating an embodiment of a block select component according to the number of valid pages.

Referring to FIG. 11, the block select component 221 may store target block information according to the number of valid pages.

According to an embodiment, an operation of determining map data to be compressed may be performed before the map data is compressed according to available-time prediction information. The map data to be compressed may be determined based on block information of memory blocks that the corresponding map data designates. The block information may include information about whether or not a particular memory block to be a target of Garbage Collection (GC) according to the number of valid pages. However, the present invention is not limited thereto. In general, making a memory block with a relatively low number of valid pages into a free block is more efficient than making a memory block within a relatively high number of valid pages into a free block because the number of valid pages to be copied is less. Accordingly, a memory block that is a target of GC may correspond to a memory block having a relatively low number of valid pages. Map data about a corresponding memory block may be needed to perform the GC. Accordingly, maintaining map data, which designates a memory block to be a target of a GC operation, in its original state without being compressed may be advantageous.

FIG. 11 illustrates the number of valid pages in each of five blocks. More specifically, in the illustrated embodiment, the first block BLK1 has seven valid pages, the second block BLK2 has four valid pages, the third block BLK3 has fifteen valid pages, the fourth block BLK4 has eleven valid pages, and the fifth block BLK5 has nineteen valid pages. Because the second block BLK2 which includes the fewest valid pages has the lowest number of valid pages to be copied, that is, four, GC may be performed on the second block first among the five blocks. On the contrary, because the fifth block BLK5 which includes the most valid pages has the greatest number of valid pages to be copied, that is, nineteen, GC may be performed on the fifth block last among the five blocks. Because the second block has the highest priority in terms of GC, maintaining map data, which designates the second block, in its original data format without being compressed may be advantageous. Because the fifth block has the lowest priority in terms of GC, storing map data, which designates the fifth block, in a compressed data format may be advantageous. Accordingly, the block select component 221 may select the map data which designates the fifth block as a target of compression among map data designating five blocks. Map data selected by the block select component 221 need not be limited to map data designating only one block; rather, map data sequentially designating a plurality of memory blocks from a memory block including the fewest valid pages to a memory block including the most valid pages may be selected.

Figures 12, 13:
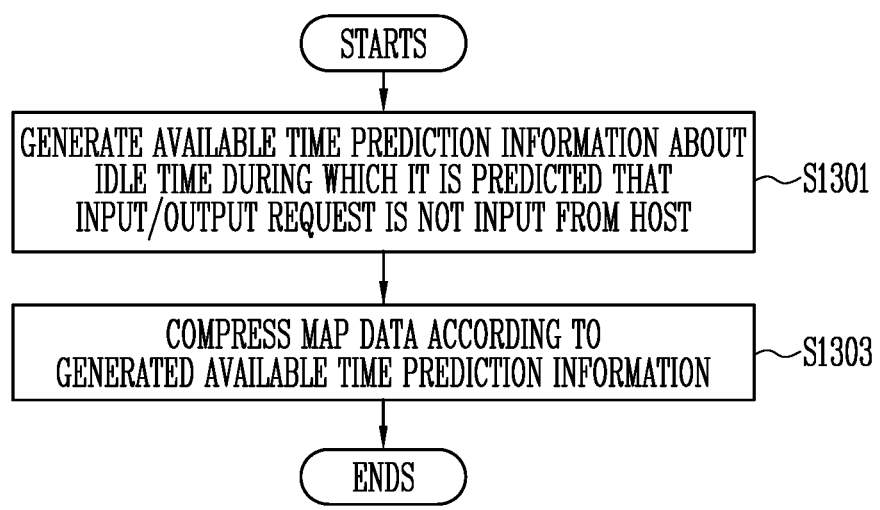
FIG. 12 is a diagram illustrating another embodiment of a block select component.
FIG. 13 is a flowchart illustrating an operation of a memory controller according to an embodiment of the present disclosure.

FIG. 12 is a diagram illustrating an embodiment of a block select component according to read count.

Referring to FIG. 12, the block select component 221 may store target block information according to read count.

According to an embodiment, an operation of selecting map data to be compressed may be performed according to available-time prediction information. The map data to be compressed may be determined based on block information of memory blocks that the corresponding map data designates. The block information may indicate whether a memory block is a target of read reclaim according to a read count. However, the present invention is not limited thereto. When a read count of a particular page in a memory block exceeds a reference value, read disturb may increase above a set level. Accordingly, to preserve original data, a memory controller may perform read reclaim in which data stored in a memory block including more than a set number of pages, each of which has read count is greater than the reference value, is moved to and written in another memory block. Map data about the corresponding memory block may be needed to perform the read reclaim. Accordingly, maintaining map data, which designates a memory block that is a target of a read reclaim operation, in its original data format without being compressed may be advantageous.

FIG. 12 illustrates, for each of five blocks, the number of pages, whose read count exceeds a reference value. More specifically, the first block BLK1 may include seven pages whose read count exceeds the reference value, the second block BLK2 may include four pages whose read count exceeds the reference value, the third block BLK3 may include fifteen pages whose read count exceeds the reference value, the fourth block BLK4 may include eleven pages whose read count exceeds the reference value, and the fifth block BLK5 may include nineteen pages whose read count exceeds the reference value. Read reclaim on the fifth block may be performed first because read disturb is most likely to occur in the fifth block which has the most pages whose read count exceeds the reference value. Read reclaim on the second block may be performed last because read disturb is least likely to occur in the second block which has the fewest pages whose read count exceeds the reference value. Accordingly, because the fifth block has the highest priority in terms of read reclaim, storing map data which designates the fifth block in its original data format may be advantageous. Because the second block has the lowest priority in terms of read reclaim, storing map data which designates the second block in a compressed data format may be advantageous. Accordingly, the block select component 221 may select the map data which designates the second block as a target of compression among map data designating five blocks. Map data selected by the block select component 221 need not be limited to map data designating one block. Rather, map data sequentially designating a plurality of memory blocks from a memory block including the fewest pages whose read count exceeds the reference value to a memory block including the most pages whose read count exceeds the reference value may be selected.

FIG. 13 is a flowchart illustrating an operation of a memory controller according to an embodiment of the present disclosure.

Referring to FIG. 13, at step S1301, the memory controller may generate available-time prediction information which is predicted time period (predicted idle time) during which an input/output request is not expected to be input from a host. The memory controller may receive input/output request information from the host and predict the idle time through machine learning. The available-time prediction information including information about whether map data is compressed may be generated by comparing the predicted idle time with a reference time that may be an average time spent in compressing the map data.

At step S1303, the memory controller may compress the map data according to the generated available-time prediction information. When the available-time prediction information indicating that the predicted idle time is an available time for compression is generated, the memory controller may compress the map data during the predicted idle time. When the available-time prediction information indicates that the predicted idle time is not an available time for compression is generated, the memory controller may omit compression of the map data.

Each of steps is described in detail below with reference to FIGS. 14 and 15.

Figure 14:
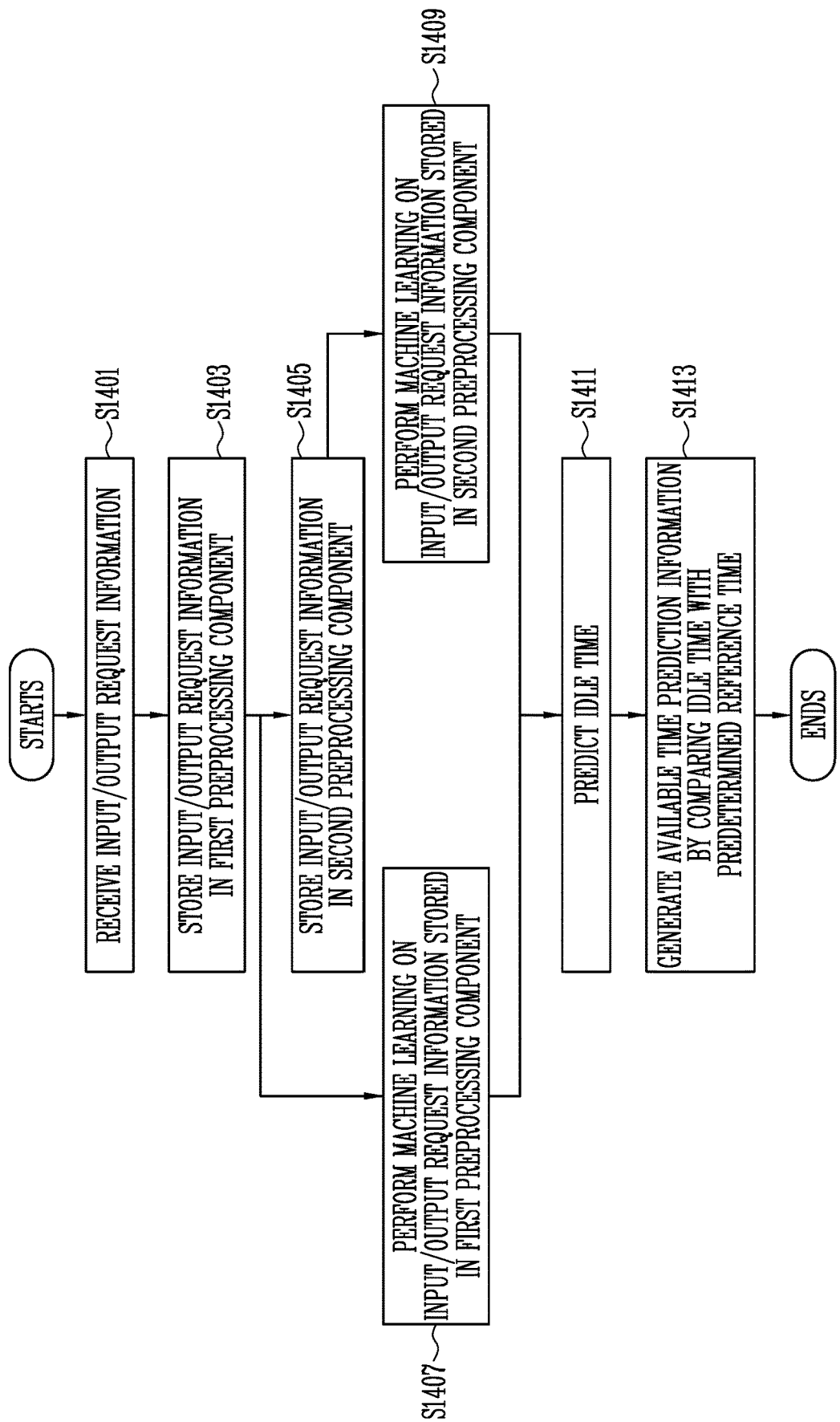
FIG. 14 is a detailed flowchart illustrating generation of available-time prediction information shown in FIG. 13.

FIG. 14 is a detailed flowchart illustrating the step of generating available-time prediction information shown in FIG. 13.

Referring to FIG. 14, at step S1401, the memory controller may receive input/output request information from a host. The input/output request information may correspond to a request to access a storage device, through which the host requests a program operation, a read operation, or the like to the storage device.

At step S1403, the memory controller may store the input/output request information in a first preprocessing component. The input/output request information stored in the first preprocessing component may correspond to input/output request information input from the host immediately before the available-time prediction information is generated. The first preprocessing component may perform an operation for processing the input/output request information to be optimized for a Recurrent Neural Network (RNN) machine learning model.

At step S1405, the memory controller may store the input/output request information in a second preprocessing component. The input/output request information stored in the second preprocessing component may correspond to input/output request information input from the first preprocessing component. The second preprocessing component may perform an operation for processing the input/output request information to be optimized for an RNN machine learning model.

At step S1407, the memory controller may perform machine learning on the input/output request information stored in the first preprocessing component. An RNN model or method may be used for machine learning. Machine learning may be performed every time input/output request information is input from the first preprocessing component.

At step S1409, the memory controller may perform machine learning on the input/output request information stored in the second preprocessing component. An RNN model or method may be used for machine learning. Machine learning may be performed every time input/output request information is input from the second preprocessing component.

At step S1411, the memory controller may empirically learn a time interval between pieces of received input/output request information and may predict an idle time between an item of received input/output request information and a next item of input/output request information to be received from the host. Machine learning may be performed every time input/output request information is input from the host and the predicted idle time may be increased or reduced accordingly.

At step S1413, the memory controller may generate available-time prediction information by comparing the predicted idle time with a set reference time. The reference time may be an average time that the memory controller spends in compressing map data. However, the present invention is not limited thereto. When the predicted idle time is longer than the reference time, it may be determined that there is enough time to complete compression of map data within the idle time. Accordingly, in this instance, the available-time prediction information includes information indicating that the predicted idle time is enough time to compress map data. When the predicted idle time is shorter than the reference time, it may be determined that that there is not enough time to complete compression of map data within the idle time. Accordingly, in this instance, the available-time prediction information includes information indicating that the predicted idle time is not the available time to compress map data.

Figure 15:
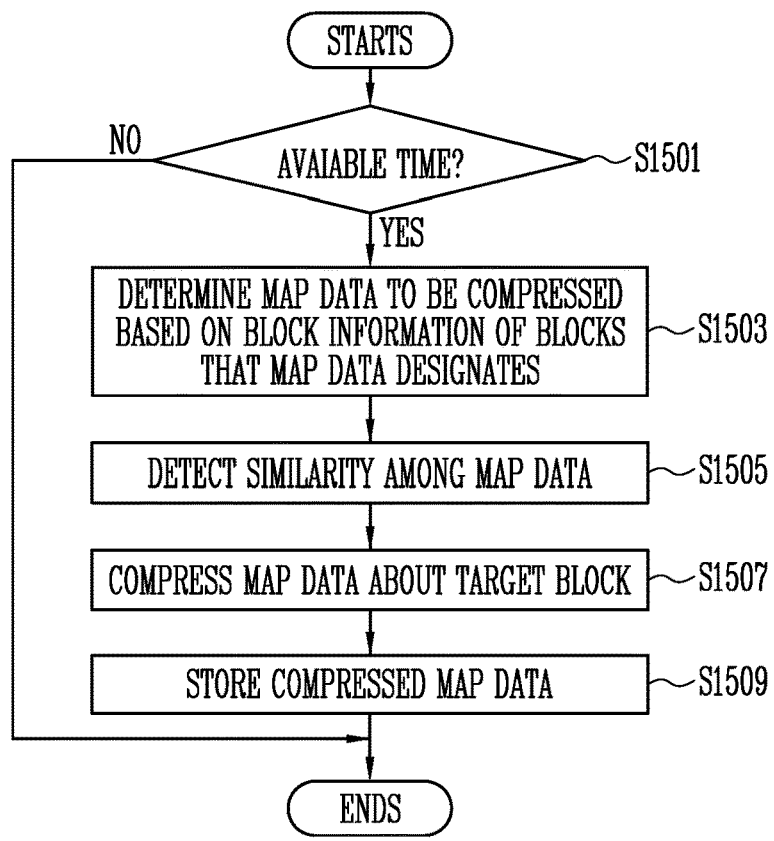
FIG. 15 is a detailed flowchart illustrating compression of map data shown in FIG. 13.

FIG. 15 is a detailed flowchart illustrating the step of compressing map data shown in FIG. 13.

Referring to FIG. 15, at step S1501, the memory controller may determine whether the predicted idle time represents available time for compression based on available-time prediction information. When the idle time represents available time for compression, step S1503 may be performed. When the idle time represents that there is not available time for compression, map data may not be compressed.

At step S1503, the memory controller may determine map data to be compressed based on block information of memory blocks that the map data designates. For example, when a memory block includes more valid pages, it is more likely that the memory block is not a target block of garbage collection. Accordingly, the corresponding map data may be determined as a target of compression. In addition, when a memory block includes fewer pages having a read count which exceeds a reference value, it is more likely that the memory block is not a target block of read reclaim. Accordingly, the corresponding map data may be determined as a target of compression.

At step S1505, the memory controller may detect similarity among pieces of map data. The similarity may correspond to differences among pieces of map data.

At step S1507, the memory controller may compress the map data based on differences among the pieces of detected map data. By way of example, a delta compression method may be used for compression of map data. According to the delta compression, data may be compressed in a way to indicate differences between each pair of sequential pieces of data, rather than compressing the entire file. In delta compression, as the difference among the pieces of data gets smaller, the size of data to be stored may be reduced. According to another embodiment, another compressing method may be used. For example, map data may be compressed by a GZIP method.

At step S1509, the memory controller may store the compressed map data in map data storage. Because the map data is stored in a compressed format, the storage capacity of the map data storage may be efficiently managed, thereby minimizing or even eliminating the need for increased storage device in terms of map data storage additionally provided thereto, as well as increase in power consumption and costs.

Figure 16:
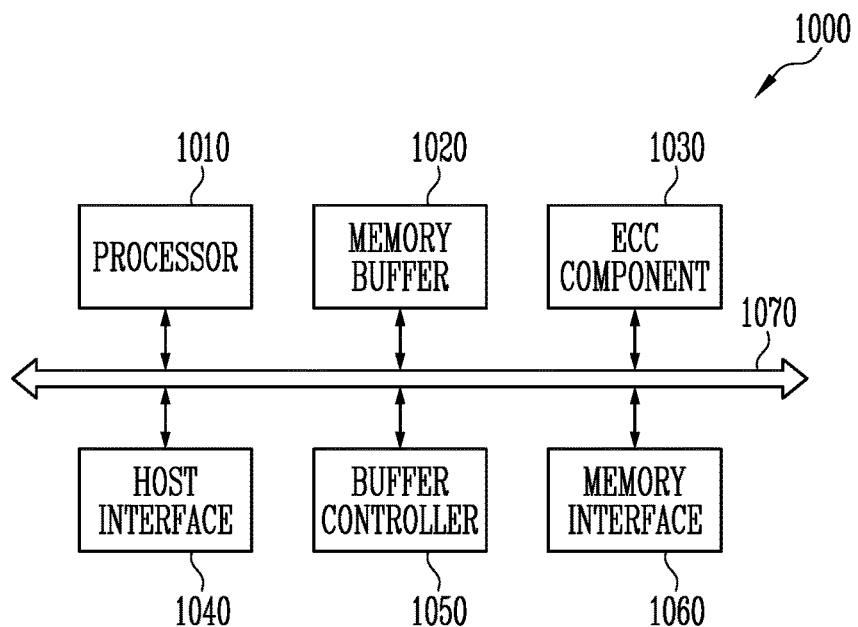
FIG. 16 is a diagram illustrating another embodiment of the memory controller shown in FIG. 1.

FIG. 16 is a diagram illustrating another embodiment of the memory controller shown in FIG. 1.

Referring to FIG. 16, a memory controller 1000 may be coupled to a host and a memory device. The memory controller 1000 may be configured to access the memory device in response to a request from the host. The memory controller 1000 may provide an interface between the memory device and the host. The memory controller 1000 may drive firmware for controlling the memory device.

The memory controller 1000 may include a processor 1010, a memory buffer 1020, an error correction code (ECC) component 1030, a host interface 1040, a buffer controller 1050, a memory interface 1060, and a bus 1070.

The bus 1070 may be configured to provide a channel between components of the memory controller 1000.

The processor 1010 may control overall operation of the memory controller 1000 and may perform a logical operation. The processor 1010 may communicate with an external host through the host interface 1040 and communicate with the memory device through the memory interface 1060. Further, the processor 1010 may communicate with the memory buffer 1020 through the buffer controller 1050. The processor 1010 may control operations of the storage device by using the memory buffer 1020 as operational memory, cache memory, or buffer memory.

The processor 1010 may perform the function of a flash translation layer (FTL). The processor 1010 may translate the logical address (LA) provided by the host into the physical address (PA) through the flash translation layer (FTL). The flash transition layer (FTL) may receive the logical address (LA) and translate the logical address (LA) into the physical address (PA) by using a mapping table. There may be various address mapping methods for the flash translation layer (FTL) depending on a mapping unit. Typical address mapping methods include a page mapping method, a block mapping method, and a hybrid mapping method.

The processor 1010 may be configured to randomize data received from the host. For example, the processor 1010 may use a randomizing seed to randomize data received from the host. The randomized data may be provided, as data to be stored, to the memory device and may be programmed in a memory cell array.

The processor 1010 may be configured to derandomize data received from the memory device during a read operation. For example, the processor 1010 may use a derandomizing seed to derandomize data received from the memory device. The derandomized data may be output to the host.

According to an embodiment, the processor 1010 may run software or firmware to perform randomizing and derandomizing operations.

The memory buffer 1020 may serve as operational memory, cache memory, or buffer memory of the processor 1010. The memory buffer 1020 may store codes and commands executed by the processor 1010. The memory buffer 1020 may store data that is processed by the processor 1010. The memory buffer 1020 may include Static RAM (SRAM) and/or Dynamic RAM (DRAM).

The ECC component 1030 may perform error correction. The ECC component 1030 may perform ECC encoding based on data to be written to the memory device through the memory interface 1060. The ECC-encoded data may be transferred to the memory device through the memory interface 1060. The ECC component 1030 may perform ECC decoding on data received from the memory device through the memory interface 1060. In an embodiment, the ECC component 1030 may be included in the memory interface 1060 as a component thereof.

The host interface 1040 may be configured to communicate with the external host under the control of the processor 1010. The host interface 1040 may perform communication using at least one of various communication methods such as Universal Serial Bus (USB), Serial AT Attachment (SATA), a Serial Attached SCSI (SAS), a High Speed Interchip (HSIC), a Small Computer System Interface (SCSI), Peripheral Component Interconnection (PCI), PCI express (PCIe), NonVolatile Memory express (NVMe), Universal Flash Storage (UFS), Secure Digital (SD), a Multi-Media Card (MMC), an embedded MMC (eMMC), a Dual In-line Memory Module (DIMM), a Registered DIMM (RDIMM), and/or a Load Reduced DIMM (LRDIMM).

The buffer controller 1050 may control the memory buffer 1020 under the control of the processor 1010.

The memory interface 1060 may be configured to communicate with the memory device under the control of the processor 1010. The memory interface 1060 may communicate commands, addresses, and data with the memory device through channels.

The memory controller 1000 does not necessarily include the memory buffer 1020 and the buffer controller 1050 in all embodiments. Either or both of these components may be provided separately, or either or both of their functions may be performed by one or more other components in the memory controller 100.

In an embodiment, the processor 1010 may control the operations of the memory controller 1000 using codes. The processor 1010 may load codes from a nonvolatile memory device (for example, ROM) provided in the memory controller 1000. In another example, the processor 1010 may load codes from the memory device through the memory interface 1060.

In an embodiment, the bus 1070 of the memory controller 1000 may include a control bus and a data bus. The data bus may be configured to transmit data in the memory controller 1000, and the control bus may be configured to transmit control information such as commands or addresses in the memory controller 1000. The data bus and the control bus may be isolated from each other, such that neither interferes with, nor influences, the other. The data bus may be coupled to the host interface 1040, the buffer controller 1050, the ECC component 1030, and the memory interface 1060. The control bus may be coupled to the host interface 1040, the processor 1010, the buffer controller 1050, the memory buffer 1020, and the memory interface 1060.

Figure 17:
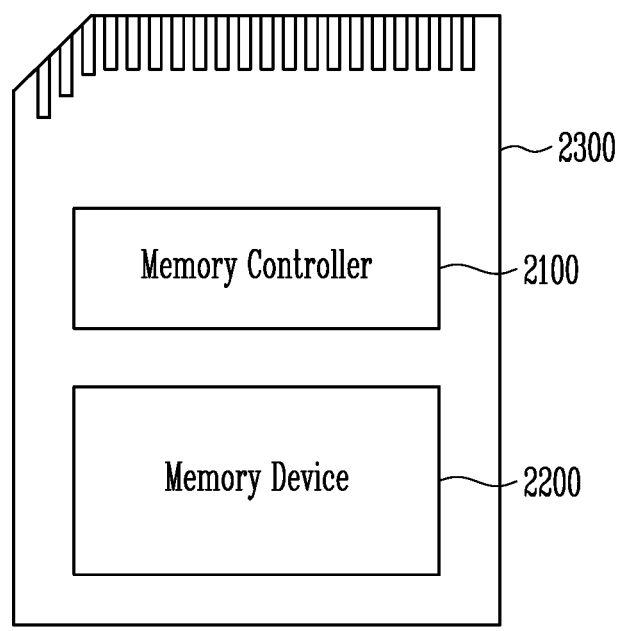
FIG. 17 is a block diagram illustrating a memory card system to which a storage device is applied according to an embodiment of the present disclosure.

FIG. 17 is a block diagram illustrating a memory card system 2000 to which a storage device is applied according to an embodiment of the present disclosure.

Referring to FIG. 17, the memory card system 2000 may include a memory controller 2100, a memory device 2200, and a connector 2300.

The memory controller 2100 may be coupled to the memory device 2200. The memory controller 2100 may be configured to access the memory device 2200. The memory controller 2100 may have the same configuration as the memory controller 200 described above with reference to FIG. 1.

In an embodiment, the memory controller 2100 may include components such as Random Access Memory (RAM), a processing unit, a host interface, a memory interface, and an ECC component.

The memory controller 2100 may communicate with an external device through the connector 2300. The memory controller 2100 may communicate with the external device (for example, a host) according to a specific communication protocol. In an embodiment, the memory controller 2100 may communicate with the external device through at least one of various communication protocols such as a Universal Serial Bus (USB), a multimedia card (MMC), an embedded MMC (eMMC), peripheral component interconnection (PCI), PCI-express (PCI-E), Advanced Technology Attachment (ATA), Serial-ATA, Parallel-ATA, a small computer system interface (SCSI), an enhanced small disk interface (ESDI), Integrated Drive Electronics (IDE), Firewire, Universal Flash Storage (UFS), Wi-Fi, Bluetooth, and/or NVMe. In an embodiment, the connector 2300 may be defined by at least one of the above-described communication protocols.

In an embodiment, the memory device 2200 may be implemented as any of various nonvolatile memory devices, such as Electrically Erasable and Programmable ROM (EEPROM), NAND flash memory, NOR flash memory, Phase-change RAM (PRAM), Resistive RAM (ReRAM), Ferroelectric RAM (FRAM), and/or Spin-Torque Magnetic RAM (STT-MRAM).

The memory controller 2100 and the memory device 2200 may be integrated into a single semiconductor device to form a memory card, such as a personal computer memory card international association (PCMCIA), a compact flash (CF) card, a smart media (SM or SMC) card, a memory stick, a multimedia card (MMC, RS-MMC, MMCmicro, and eMMC), an SD (SD, miniSD, microSD, or SDHC) card, and/or universal flash storage (UFS).

The memory controller 2100 shown in FIG. 17 may be the memory controller 200 described with reference to FIG. 1 or the memory controller 1000 described with reference to FIG. 16. In addition, the memory device 2200 may be the memory device 100 described with reference to FIG. 1.

Figure 18:
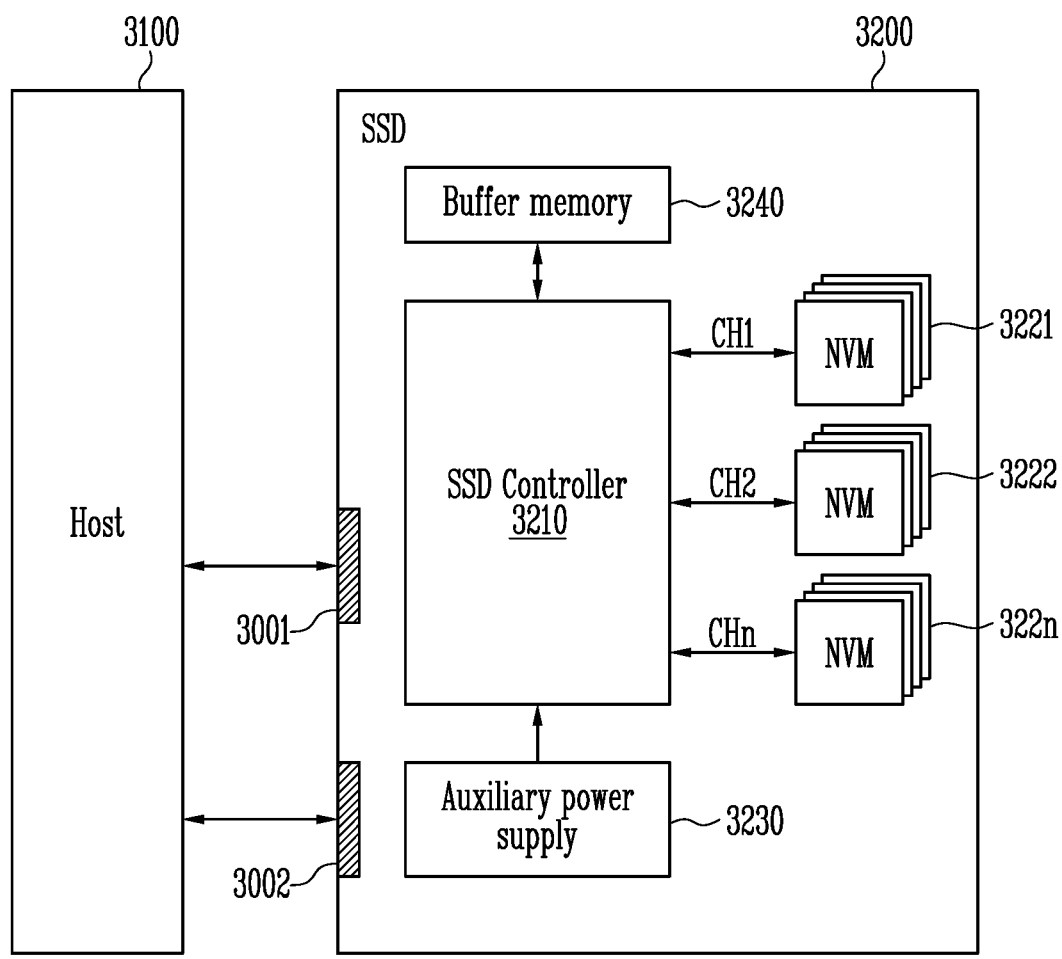
FIG. 18 is a block diagram illustrating a Solid State Drive (SSD) system to which a storage device is applied according to an embodiment of the present disclosure.

FIG. 18 is a block diagram illustrating a Solid State Drive (SSD) system 3000 to which a storage device is applied according to an embodiment of the present disclosure.

Referring to FIG. 18, the SSD system 3000 may include a host 3100 and an SSD 3200. The SSD 3200 may exchange signals (SIG) with the host 3100 through a signal connector 3001 and may receive power (PWR) through a power connector 3002. The SSD 3200 may include an SSD controller 3210, a plurality of flash memories 3221 to 322*n*, an auxiliary power supply 3230, and a buffer memory 3240.

According to an embodiment, the SSD controller 3210 may perform the function of the memory controller 200 as described above with reference to FIG. 1.

The SSD controller 3210 may control the plurality of flash memories 3221 to 322*n* in response to the signals (SIG) received from the host 3100. In an embodiment, the signals (SIG) may be based on interface(s) of the host 3100 and the SSD 3200. For example, the signals (SIG) may be defined by at least one of various interfaces such as a Universal Serial Bus (USB), a multimedia card (MMC), an embedded MMC (eMMC), peripheral component interconnection (PCI), PCI-express (PCI-E), Advanced Technology Attachment (ATA), Serial-ATA, Parallel-ATA, a small computer system interface (SCSI), an enhanced small disk interface (ESDI), Integrated Drive Electronics (IDE), Firewire, Universal Flash Storage (UFS), Wi-Fi, Bluetooth, and/or NVMe.

The auxiliary power supply 3230 may be coupled to the host 3100 through the power connector 3002. The auxiliary power supply 3230 may be supplied with power (PWR) from the host 3100 and may be charged. The auxiliary power supply 3230 may supply the power of the SSD 3200 when power is not smoothly supplied from the host 3100. In an embodiment, the auxillary power supply 3230 may be positioned inside or outside the SSD 3200. For example, the auxiliary power supply 3230 may be disposed in a main board and may supply auxiliary power to the SSD 3200.

The buffer memory 3240 may function as buffer memory of the SSD 3200. For example, the buffer memory 3240 may temporarily store data received from the host 3100 or data received from the plurality of flash memory 3221 to 322*n*, or may temporarily store metadata (for example, mapping tables) of the flash memories 3221 to 322*n*. The buffer memory 3240 may include volatile memory such as DRAM, SDRAM, DDR SDRAM, LPDDR SDRAM, and GRAM or nonvolatile memory such as FRAM, ReRAM, STT-MRAM, and PRAM.

Figure 19:
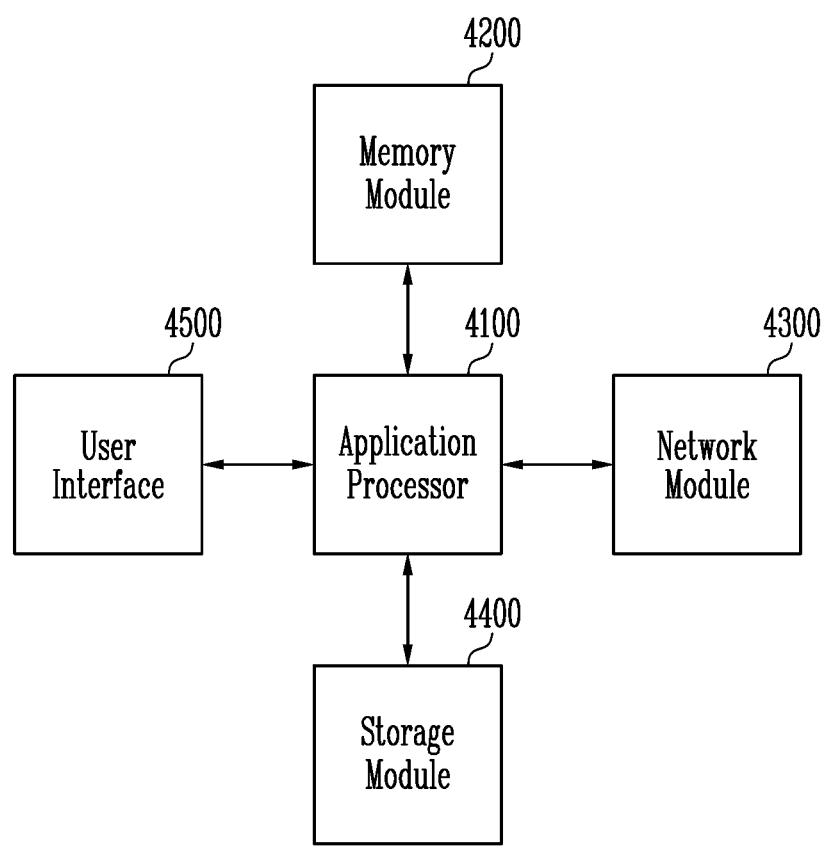
FIG. 19 is a block diagram illustrating a user system to which a storage device is applied according to an embodiment of the present disclosure.

FIG. 19 is a block diagram illustrating a user system 4000 to which a storage device is applied according to an embodiment of the present disclosure.

Referring to FIG. 19, the user system 4000 may include an application processor 4100, a memory module 4200, a network module 4300, a storage module 4400, and a user interface 4500.

The application processor 4100 may run components included in the user system 4000, an operating system (OS), or a user program. In an embodiment, the application processor 4100 may include controllers, Interfaces, graphic engines, and the like for controlling the components included in the user system 4000. The application processor 4100 may be provided as a System-on-Chip (SoC).

The memory module 4200 may function as main memory, operational memory, buffer memory, or cache memory of the user system 4000. The memory module 4200 may include volatile random access memory such as DRAM, SDRAM, DDR SDRAM, DDR2 SDRAM, DDR3 SDRAM, LPDDR SDRAM, and/or LPDDR3 SDRAM, and/or nonvolatile random access memory such as PRAM, ReRAM, MRAM, and/or FRAM. In an embodiment, the application processor 4100 and the memory module 4200 may be packaged based on package-on-package (POP) and may then be provided as a single semiconductor package.

The network module 4300 may communicate with external devices. In an embodiment, the network module 4300 may support wireless communication, such as Code Division Multiple Access (CDMA), a Global System for Mobile communication (GSM), wideband CDMA (WCDMA), CDMA-2000, Time Division Multiple Access (TDMA), Long Term Evolution (LTE), Wimax, WLAN, UWB, Bluetooth, or Wi-Fi. In an embodiment, the network module 4300 may be included in the application processor 4100.

The storage module 4400 may store data. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as Phase-change RAM (PRAM), Magnetic RAM (MRAM), Resistive RAM (RRAM), NAND flash memory, NOR flash memory, or NAND flash memory having a three-dimensional (3D) structure. In an embodiment, the storage module 4400 may be provided as a removable storage medium (i.e., removable drive), such as a memory card or an external drive of the user system 4000.

According to an embodiment, the storage module 4400 may include a plurality of nonvolatile memory devices, each of which may be operated in the same manner as the memory device 100 as described above with reference to FIG. 1. The storage module 4400 may operate in the same manner as the storage device 50 described above with reference to FIG. 1.

The user interface 4500 may include interfaces which input data or instructions to the application processor 4100 or output data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as a Liquid Crystal Display (LCD), an Organic Light Emitting Diode (OLED) display device, an Active Matrix OLED (AMOLED) display device, an LED, a speaker, and a monitor.

According to embodiments of the present disclosure, a memory controller having an improved response time for an input/output request and increased capacity of remaining Dynamic Random Access Memory (DRAM) and an operating method of the memory controller are provided.

While various embodiments of the present invention have been illustrated and described, those skilled in the art will understand in light of the present disclosure that various modifications may be made to any of the disclosed embodiments. The present invention encompasses all such modifications to the extent they fall within the scope of the claims.

What is claimed is:

1. A memory controller controlling a memory device, the memory controller comprising:
   an available-time prediction component configured to perform a machine learning operation using a Recurrent Neural Network (RNN) model based on input/output request information about an input/output request input from a host, and to predict an idle time representing a time during which the input/output request is not expected to be input from the host; and
   a data compression controller configured to generate, in response to the idle time longer than a set reference time, compressed map data by compressing map data of data having a read count less than a reference number among data stored in the memory device,
   wherein the map data indicates a mapping relationship between a logical address provided by the host and a physical address indicating a physical location of a memory block included in the memory device.

2. The memory controller of claim 1, wherein the available-time prediction component comprises:
   a plurality of preprocessing components configured to translate the input/output request information into data used for machine learning; and
   a plurality of information processing components configured to perform machine learning for predicting the idle time by using output of the plurality of preprocessing components, and to output available-time prediction information about whether the idle time is enough time to compress the map data, which represents an available time.

3. The memory controller of claim 2, wherein the plurality of information processing components perform machine learning by the Recurrent Neural Network (RNN) model.

4. The memory controller of claim 3, wherein the plurality of information processing components perform machine learning by a Long Short Term Memory (LSTM) method which is a type of Recurrent Neural Network (RNN) model designed to have long-term memory or short-term memory.

5. The memory controller of claim 2, wherein the plurality of information processing components have a Fully Connected Layer (FCL) in which nodes of a previous layer and nodes of a current layer are fully connected.

6. The memory controller of claim 2, wherein the data compression controller comprises:
   a block select component configured to determine, in response to the idle time longer than the set reference time, compression target map data which is map data to be compressed among the map data according to block information of the memory block;
   a similarity detector configured to detect a difference among the compression target map data; and
   a compression component configured to compress the compression target map data.

7. The memory controller of claim 6, wherein the compression component compresses the compression target map data by a delta compression method.

8. The memory controller of claim 6, wherein the compression component compresses the compression target map data by a GZIP method.

9. The memory controller of claim 6, wherein the block information includes information about a number of valid pages included in the memory block or a read count of pages included in the memory block.

10. The memory controller of claim 1, wherein the set reference time is an average time spent in compressing the map data.

11. A method of operating a memory controller for controlling a memory device, the method comprising:
   receiving input/output request information from a host;
   predicting, based on machine learning using a Recurrent Neural Network (RNN) model, an idle time representing a time during which an input/output request is not expected to be input from the host; and
   compressing, in response to the idle time longer than a set reference time, map data of data having a read count less than a reference number among data stored in the memory device,
   wherein the map data which is mapping information of a logical address provided by the host and a physical address indicating a physical location of a memory block included in the memory device.

12. The method of claim 11, wherein the predicting of the idle time comprises:
  processing the input/output request information to be optimized to machine learning;
  performing machine learning for predicting the idle time based on the input/output request information; and
  generating available-time prediction information about whether the idle time is enough time to compress the map data, which represents an available time.

13. The method of claim 12, wherein the performing of the machine learning is executed by a Long Short Term Memory (LSTM) method which is a type of Recurrent Neural Network (RNN) model designed to have long-term memory or short-term memory.

14. The method of claim 12, wherein the performing of the machine learning is executed in a Fully Connected Layer (FCL) in which nodes of a previous layer and nodes of a current layer are fully connected.

15. The method of claim 12, wherein the generating of the available-time prediction information is executed in a Fully Connected Layer (FCL) in which nodes of a previous layer and nodes of a current layer are fully connected.

16. The method of claim 11, wherein the compressing of the map data is executed by a delta compression method in which data may be compressed based on a difference between pieces of sequential data.

17. The method of claim 16, wherein the compressing of the map data comprises compressing data by a GZIP method.

18. The method of claim 11, wherein the compressing of the map data comprises determining compression target map data based on block information of blocks storing the map data.

19. The method of claim 18, wherein the block information includes information about a number of valid pages included in the memory block or a read count of pages included in the memory block.

20. An operating method of a controller for controlling a storage device including blocks, the operating method comprising:
  controlling, in response to access requests, the storage device to access the blocks;
  accumulating the access requests;
  predicting, by applying machine learning to the accumulated access requests, an idle time during which an access request is not expected to be received; and
  compressing map information related to select blocks during the idle time,
  wherein time required to compress the map information is shorter than the idle time, and
  wherein the select blocks include more valid data than other blocks.

* * * * *